United States Patent [19]
Nakaya et al.

[11] Patent Number: 5,959,692
[45] Date of Patent: Sep. 28, 1999

[54] TELEVISION-SIGNAL PROCESSING APPARATUS AND TELEVISION-SIGNAL PROCESSING

[75] Inventors: Hideo Nakaya; Tetsujiro Kondo, both of Kanagawa, Japan

[73] Assignee: Sony Corporation, Tokyo, Japan

[21] Appl. No.: 08/915,287

[22] Filed: Aug. 20, 1997

[30] Foreign Application Priority Data

Aug. 21, 1996 [JP] Japan ..................................... 8-219600
Dec. 20, 1996 [JP] Japan ..................................... 8-341053

[51] Int. Cl.$^6$ ...................................................... H04N 5/21
[52] U.S. Cl. ........................... 348/607; 348/608; 348/609; 348/624; 348/497; 386/13
[58] Field of Search ..................................... 348/607, 609, 348/612, 616, 617, 621, 624, 497, 498, 499, 420, 471, 615, 618; 386/13, 16, 17, 18, 20; H04N 5/21

[56] References Cited

U.S. PATENT DOCUMENTS 4,296,436  10/1981  Achiha ...................................... 348/700
4,851,904   7/1989  Miyazaki ................................. 348/701
5,499,057   3/1996  Kondo ...................................... 348/607
5,555,465   9/1996  Kondo ...................................... 348/571

Primary Examiner—John K. Peng
Assistant Examiner—Wesner Sajous
Attorney, Agent, or Firm—Frommer Lawrence & Haug, LLP.; William S. Frommer; Dennis M. Smid

[57] ABSTRACT

The present invention relates in general to a digital-signal processing apparatus as well as a digital-signal processing method and, in particular, to a jitters removing apparatus as well as a jitters removing method. In the apparatus provided by the present invention, a TV signal received by a tuner or a video signal supplied by a VCR is fed to a moving-average correction circuit and a first FIFO circuit. In a correlation-value computing circuit, correlation between a carrier chrominance signal extracted by the moving-average correction and a carrier chrominance signal delayed by a second FIFO circuit by a predetermined time is found and a correlation value having a maximum absolute value is supplied to a quantization circuit. In the quanitization circuit, the quantization value is quantized to determine a class code. Then, coefficients for taps indicated by the class code are read out from a coefficient ROM unit and supplied to a linear first-order weighed-sum computing circuit. On the other hand, video signaling delayed by the first FIFO circuit are converted by a blocking circuit into a plurality of pixels signals appearing at the taps cited above and also supplied to the linear first-order weighted-sum computing circuit. In the linear first-order weighted-sum computing circuit, the pixel signals are multiplied by the respective coefficients and products resulting from the multiplication are added up to produce a weighted sum. In this way, a signal with jitters thereof removed is generated.

40 Claims, 13 Drawing Sheets

TELEVISION-SIGNAL PROCESSING APPARATUS AND TELEVISION-SIGNAL PROCESSING

BACKGROUND OF THE INVENTION

In general, the present invention relates to a television-signal processing apparatus and a television signal processing method. In particular, the present invention relates to a television-signal processing apparatus and a television signal processing method wherein time-axis correction is carried out for removing jitters from a television signal by generating a television signal that maximizes correlation between a carrier chrominance signal for a predetermined scanning line constituting a predetermined field and a carrier chrominance signal for a scanning line adjacent thereto.

A television (TV) signal broadcasted by a television broadcasting station or a TV signal played back by an analog VCR (Video Cassette Recorder) includes time-axis variations known as jitters. If a TV signal including jitters is displayed on a monitor as it is, lines are vibrating to the right and left, making it impossible to obtain good-quality pictures.

FIG. 12 is a diagram showing three continuous lines of carrier chrominance signal in a predetermined field of a TV signal including jitters. In the figure, 198th, 200th and 202nd lines of carrier chrominance signal in a predetermined (even) field are shown as a solid line, a fine dotted line and a rough dotted line respectively.

Since the phase of the carrier chrominance signal of each line is modulated by a chrominance signal for the line, the phase basically varies from line to line. Since there is correlation between adjacent lines, however, the correlation value is relatively large even though the correlation value decreases due to the existence of jitters.

The correlation value between the carrier chrominance signals of the 198th and 202nd lines, the correlation value between the carrier chrominance signals of the 198th and 200th lines, and the correlation value between the carrier chrominance signals of the 200th and 202nd lines shown in FIG. 12 are found to be 0.913390, −0.103358 and −0.104299 respectively.

As described above, the correlation value between the carrier chrominance signals of the 198th and 202nd lines is positive but the correlation value between the carrier chrominance signals of the 198th and 200th lines and the correlation value between the carrier chrominance signals of the 200th and 202nd lines are negative. This is because, in the case of the former correlation value, the carrier chrominance signals have the same reference phase while, for each of the latter two correlation values, the carrier chrominance signals have reference phases opposite to each other.

The larger the absolute value of a correlation value, the smaller the effect of jitters and, thus, the more the phases of the carrier chrominance signals represented by the correlation value match each other. For example, the absolute values of the correlation value between the carrier chrominance signals of the 198th and 200th lines and that between the carrier chrominance signals of the 200th and 202nd lines are 0.103358 and 0.104299 respectively which are not large enough in comparison with the absolute value 0.913390 of the correlation value between the carrier chrominance signals of the 198th and 202nd lines.

In order to solve the problem, equipment for business applications and high-end equipment for general consumers employ a TBC (Time Base Corrector) for removing jitters from a TV signal.

FIG. 13 is a block diagram showing a typical configuration of the related art TBC 1.

As shown in the figure, a TV signal broadcasted by a TV broadcasting station or a TV signal played back by a VCR such as a home VCR is supplied to an H/V synchronization separating circuit 11 and an A/D conversion circuit 12 employed in the TBC 1. The H/V synchronization separating circuit 11 is used for extracting horizontal-synchronization (H) and vertical-synchronization (V) signals from the TV signal and outputting the extracted horizontal-synchronization (H) and vertical-synchronization (V) signals to a write-clock generating circuit 13.

The write-clock generating circuit (PLL) 13, a kind of PLL circuit, uses the extracted horizontal-synchronization (H) and vertical-synchronization (V) signals for generating a write clock signal and supplying the write clock signal to the A/D conversion circuit 12 and a write-address counter 15. Driven by the write clock signal supplied from the write-clock generating circuit 13, the A/D conversion circuit 12 converts the analog TV signal into a digital one and supplies the digital signal to a memory unit 14.

In synchronization with the write clock signal supplied from the write-clock generating circuit 13, the write-address counter 15 increments a counter value thereof, supplying the incremented counter value to the memory unit 14 as an address. The memory unit 14 stores the digital signal supplied thereto by the A/D conversion circuit 12 at an address indicated by the incremented counter value supplied thereto by the write-address counter 15.

A read-clock generating circuit 19 comprises, among other components, a fixed-frequency crystal oscillating circuit for outputting a read clock signal having a constant frequency to a D/A conversion circuit 16 and a read-address counter 17.

A jump detecting circuit 18 detects a difference between a write address, a counter value output by the write-address counter 15, and a read address, a counter value output by the read-address counter 17. When the difference which ideally has a fixed value goes beyond a predetermined range, the jump detecting circuit 18 controls the read-address counter 17 in such a way that the difference returns to a value in the predetermined range.

In synchronization with the read clock signal supplied from the read-clock generating circuit 19, the read-address counter 17 increments a counter value thereof, supplying the incremented counter value to the memory unit 14 as an address. The memory unit 14 reads digital data at an address indicated by the incremented counter value supplied thereto by the read-address counter 17, supplying the digital data to the D/A conversion circuit 16. The D/A conversion circuit 16 converts the digital data supplied thereto by the memory unit 14 into an analog signal, outputting the analog signal to a signal processing circuit.

In this way, the horizontal-synchronization (H) and vertical-synchronization (V) signals extracted from a TV signal are used for generating a write clock signal locked to the phase of the carrier chrominance signal. The write clock signal is in turn used for writing digital data into the memory unit 14 which is then read out back by using a read clock signal with a fixed phase in order to remove jitters from the TV signal.

There is raised a problem, however, that a method using a TBC with a configuration described above is the only related art technique for reducing the number of jitters included in a TV signal, leaving no other alternative. In addition, when a TBC designed for equipment for business applications is applied to equipment for general consumers as has been done traditionally so far, a special circuit such as a chroma conversion circuit is required, giving rise to a problem of entailing a circuit configuration with an increased size.

SUMMARY OF THE INVENTION

The present invention addresses the problems described above; it is thus an object of the present invention to provide a television-signal processing apparatus and a television-signal processing method capable of reducing the number of jitters included in a TV signal without using the related art TBC having the configuration described above.

According to one aspect of the present invention, there is provided a television-signal processing apparatus for processing a television signal including a video signal comprising a plurality of scanning lines, said apparatus comprising:

an extracting means for extracting a carrier chrominance signal of a predetermined scanning line in a predetermined field of said video signal;

a class-code generating means for generating a class code on the basis of correlation between a first carrier chrominance signal of a first scanning line and a second carrier chrominance signal of a second scanning line adjacent to said first scanning line;

a coefficient generating means for generating a set of coefficients for a class indicated by said class code; and a video-signal generating means for generating a video signal with jitters thereof corrected from said video signal and said coefficients generated by said coefficient generating means.

According to another aspect of the present invention, there is provided a television-signal processing apparatus for processing a television signal including a video signal comprising a plurality of scanning lines, said apparatus comprising:

an extracting means for extracting a luminance signal of a predetermined scanning line in a predetermined field of said video signal;

a class-code generating means for generating a class code on the basis of a movement quantity between a first luminance signal of a first scanning line and a second luminance signal of a second scanning line adjacent to said first scanning line;

a coefficient generating means for generating a set of coefficients for a class indicated by said class code; and a video-signal generating means for generating a video signal with jitters thereof corrected from said video signal and said coefficients generated by said coefficient generating means.

According to still another aspect of the present invention, there is provided a television-signal processing method for processing a television signal including a video signal comprising a plurality of scanning lines, said method comprising the steps of:

extracting a carrier chrominance signal of a predetermined scanning line in a predetermined field of said video signal;

generating a class code on the basis of correlation between a first carrier chrominance signal of a first scanning line and a second carrier chrominance signal of a second scanning line adjacent to said first scanning line;

generating a set of coefficients for a class indicated by said class code; and generating a video signal with jitters thereof corrected from said video signal and said coefficients.

According to a still further aspect of the present invention, there is provided a television-signal processing method for processing a television signal including a video signal comprising a plurality of scanning lines, said method comprising the steps of:

extracting a luminance signal of a predetermined scanning line in a predetermined field of said video signal;

generating a class code on the basis of a movement quantity between a first luminance signal of a first scanning line and a second luminance signal of a second scanning line adjacent to said first scanning line;

generating a set of coefficients for a class indicated by said class code; and generating a video signal with jitters thereof corrected from said video signal and said coefficients.

BRIEF DESCRIPTION OF THE DRAWINGS

Embodiments of the present invention will be described in detail with reference to the following figures wherein.

DETAILED DESCRIPTION OF THE PREFERRED EMBODIMENTS

The present invention will become more apparent from a study of the following detailed description of some preferred embodiments with reference to the accompanying diagrams explained briefly above. The technical term "circuit" used in the figures should be interpreted in a broad sense, that is, not in sense limited to the embodiments. For example, a hardware circuit can mean a computer carrying out processing by execution of software loaded thereto, a microprocessor, a microcomputer or a combination of them.

Figure 1:
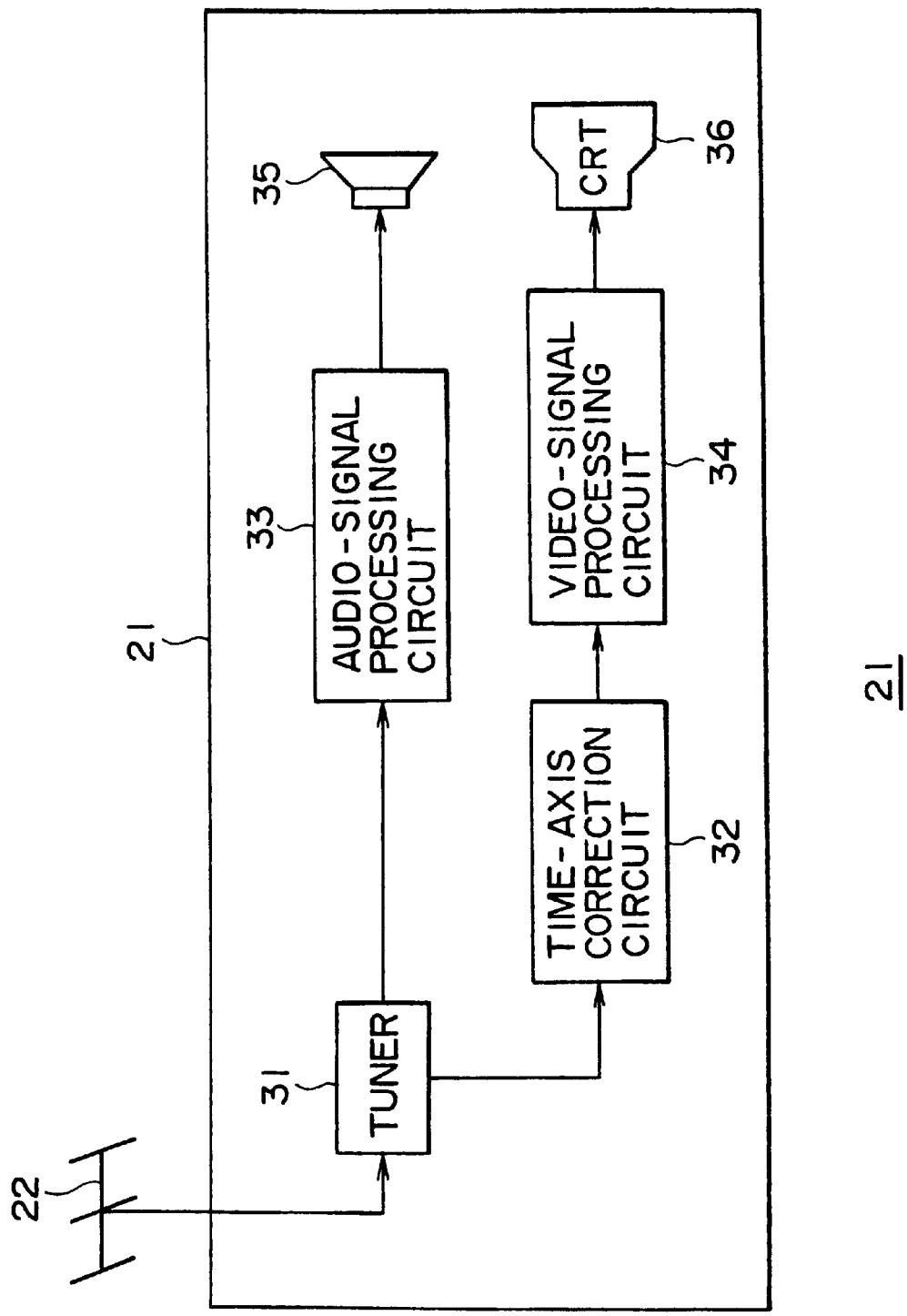
FIG. 1 is a block diagram showing the configuration of an embodiment implementing a TV receiver 21 employing a TV-signal processing apparatus provided by the present embodiment.

FIG. 1 is a block diagram showing the configuration of an embodiment implementing a TV receiver 21 employing a TV-signal processing apparatus provided by the present embodiment. It should be noted that while the following is description of a case in which a TV signal of the NTSC system is received from a television broadcasting station, the description should not be construed in a limiting sense. That is to say, the scope of the present invention is not limited to such a case. For example, the present invention can also be applied to a TV signal played back by a VCR for consumer applications.

A TV signal of the NTSC system broadcasted from a television broadcasting station is received by an antenna 22. A tuner 31 employed in the TV receiver 21 is used for selecting a predetermined TV broadcast channel. A video signal output by the tuner 31 is supplied to a time-axis correction circuit 32. On the other hand, an audio signal output by the tuner 31 is supplied to an audio-signal processing circuit 33 for carrying out pieces of processing such as demodulation and amplification on the audio signal before outputting it to a speaker 35.

The time-axis correction circuit 32 extracts carrier chrominance signals multiplexed in the video signal, computing a correlation value between a carrier chrominance signal for a predetermined scanning line and a delayed carrier chrominance signal for a scanning line adjacent thereto. The time-axis correction circuit 32 then finds a delay time (for reducing the number of jitters) that maximizes the absolute value of the correlation value. Then, by processing a video signal (that is, a video signal compensated for jitters or a video signal with a reduced number of jitters ) delayed by the delay time using a predetermined processing formula to be described later, a video signal compensated for jitters can be generated. The video signal compensated for jitters is then supplied to a video-signal processing circuit 34 for carrying pieces of processing such as demodulation and amplification on the video signal compensated for jitters from the time-axis correction circuit 32 before supplying it to a CRT (Cathode-Ray Tube) 36.

Figure 2:
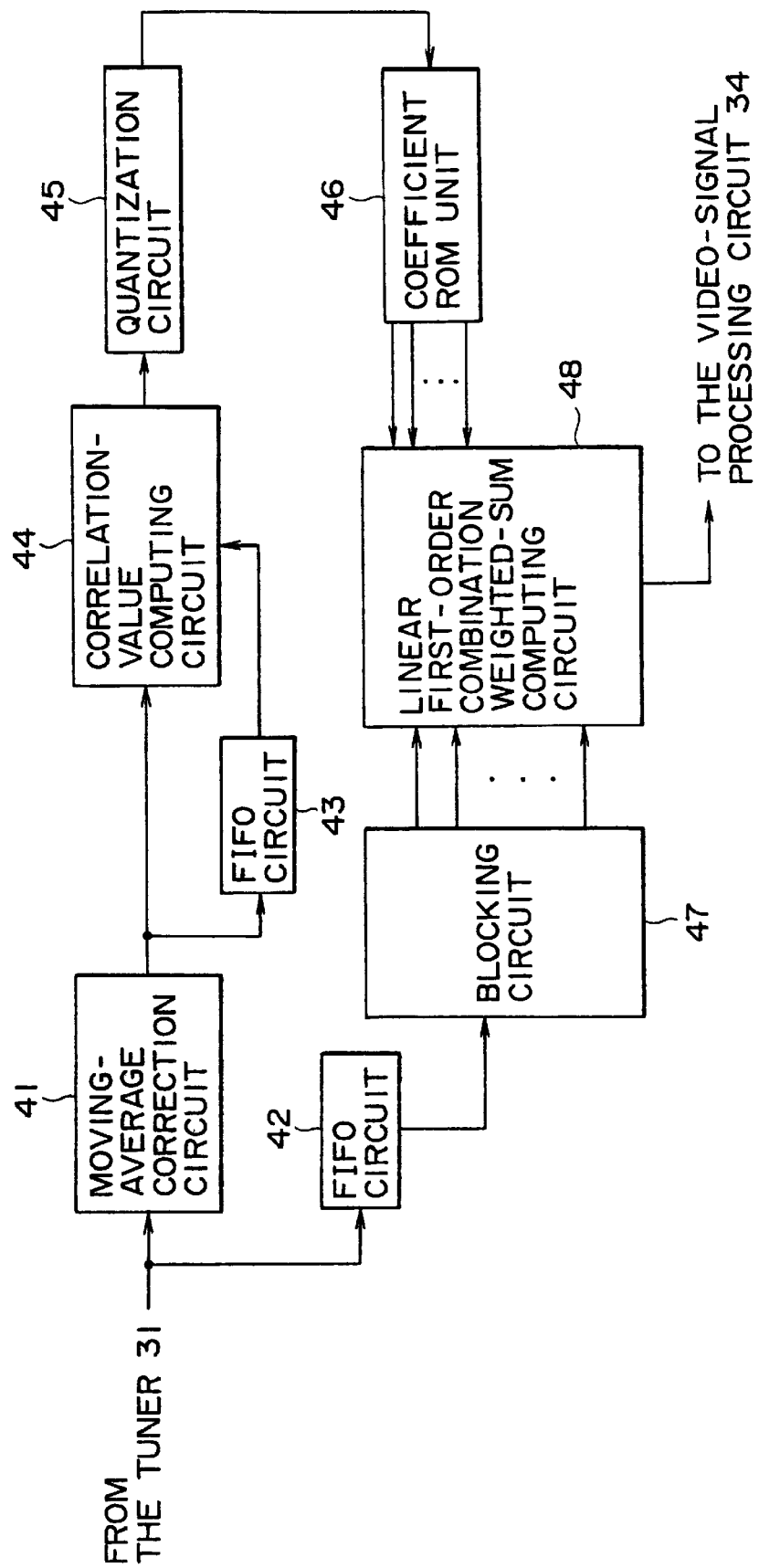
FIG. 2 is a block diagram showing the configuration of an embodiment implementing a time-axis correction circuit 32 of the TV receiver 21 provided by the present invention.

The time-axis correction circuit 32 is described by referring to diagrams as follows. FIG. 2 is a block diagram showing the configuration of an embodiment implementing the time-axis correction circuit 32 provided by the present invention.

As shown in the figure, the video signal generated by the tuner 31 is supplied to the moving-average correction circuit 41 and a FIFO (First in First out) circuit 42 employed in the time-axis correction circuit 32. It should be noted that the video signal supplied by the tuner 31 is, first of all, converted into a digital video signal by an A/D (Analog-to-Digital) conversion circuit not shown in the figure before being supplied to the moving-average correction circuit 41 and the FIFO circuit 42 and it is actually the digital video signal resulting from the A/D conversion that is supplied to the moving-average correction circuit 41 and a FIFO circuit 42.

The moving-average correction circuit 41 extracts carrier chrominance signals multiplexed in the digital video signal with digital video data for typically four consecutive pixels used as a base. By adding 128 to each of the levels of the carrier chrominance signals, the moving-average correction circuit 41 outputs carrier chrominance signals with levels of 0 to 255 to another FIFO circuit 43 and a correlation-value processing circuit 44.

The FIFO circuit 43 delays chrominance carrier signals of predetermined lines constituting a predetermined field from the moving-average correction circuit 41 by a predetermined time, supplying the delayed chrominance carrier signals to a correlation-value computing circuit 44. To be more specific, the FIFO circuit 43 delays chrominance carrier signals of predetermined lines constituting a predetermined field from the moving-average correction circuit 41 by a time corresponding to typically one line, supplying the delayed chrominance carrier signals to the correlation-value computing circuit 44.

The correlation-value computing circuit 44 computes a correlation value between a carrier chrominance signal supplied by the moving-average correction circuit 41 and a delayed carrier chrominance signal supplied by the FIFO circuit 43, supplying the correlation value to a quantization circuit 45.

The quantization circuit 45 shifts the correlation value supplied by the correlation-value computing circuit 44 to a proper level and then converts it into an integer quantization code (or a class code) by carrying out rounding processing, outputting the quantization code to a coefficient ROM unit 46. The coefficient ROM unit 46 then outputs a set of coefficients for taps (of delay circuits to be described later) stored at addresses indicated by the quantization code supplied from the quantization circuit 45 to a linear first-order combination weighted-sum computing circuit 48.

The FIFO circuit 42 delays the digital video signal supplied thereto by the tuner 31 by a period up to a point of time at which the set of coefficients for the taps is supplied to the linear first-order combination weighted-sum computing circuit 48. The delayed digital video signal is then supplied to the blocking circuit 47.

The blocking circuit 47 converts the digital video signal supplied by the FIFO circuit 42 into block pixel signals, that is, pixel signals of a block unit which comprises to a pixel of interest and a plurality of pixels in the same line in close proximity to the pixel of interest. The block pixel signals are then output to the linear first-order combination weighted-sum computing circuit 48. It should be noted that the number of pixels represented by the block pixel signals is equal to the number of coefficients in the set of coefficients read out from the coefficient ROM unit 46.

The linear first-order combination weighted-sum computing circuit 48 carries out a linear first-order combination process on the set of coefficients for the taps (of delay circuits to be described later) read out from the coefficient ROM unit 46 and the block pixel signals for the taps supplied by the blocking circuit 47. To be more specific, the pixel value of each block pixel signal is multiplied by a coefficient associated with the block pixel signal and the sum of products each resulting from multiplication of the value of a block pixel signal by the associated coefficient is then calculated. After undergoing the linear first-order combination process, the digital video signal is supplied to a D/A (Digital-to-Analog) conversion circuit not shown in the figure to be converted into an analog video signal which is then fed to the video-signal processing circuit 34 as an output video signal. This output video signal is a video signal compensated for its jitters or a video signal with a reduced number of jitters.

Figure 3:
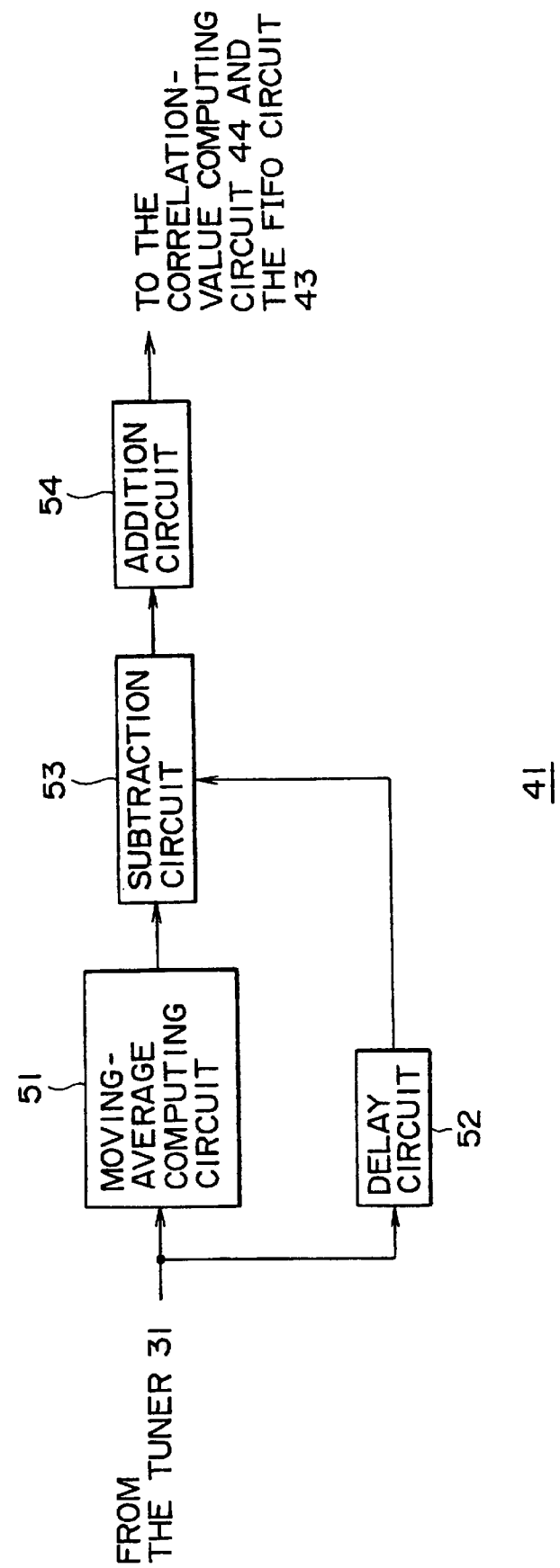
FIG. 3 is a block diagram showing the configuration of an embodiment implementing a moving-average correction circuit 41 employed in the time-axis correction circuit 32 shown in FIG. 2.

FIG. 3 is a block diagram showing the configuration of an embodiment implementing the moving-average correction circuit 41 of FIG. 2. As shown in the figure, a digital video signal supplied to the moving-average correction circuit 41 is fed to a moving-average computing circuit 51 and a delay circuit 52. The moving-average computing circuit 51 computes the average of video signals of a predetermined number of consecutive pixels, that is, the average of video signals of typically four consecutive pixels, outputting an average video signal representing the average to a subtraction circuit 53.

The subtraction circuit 53 subtracts a video signal of a predetermined pixel supplied and delayed by a time corresponding to a plurality of pixels by the delay circuit 52 from the average video signal supplied by the moving-average computing circuit 51 in order to extract a carrier chrominance signal which is then output to an addition circuit 54. The addition circuit 54 adds a signal with a level of 128 to the carrier chrominance signal to produce a carrier chrominance signal at a level in the range 0 to 255 which is then supplied to the FIFO circuit 43 and the correlation-value computing circuit 44 shown in FIG. 2.

Figure 4:
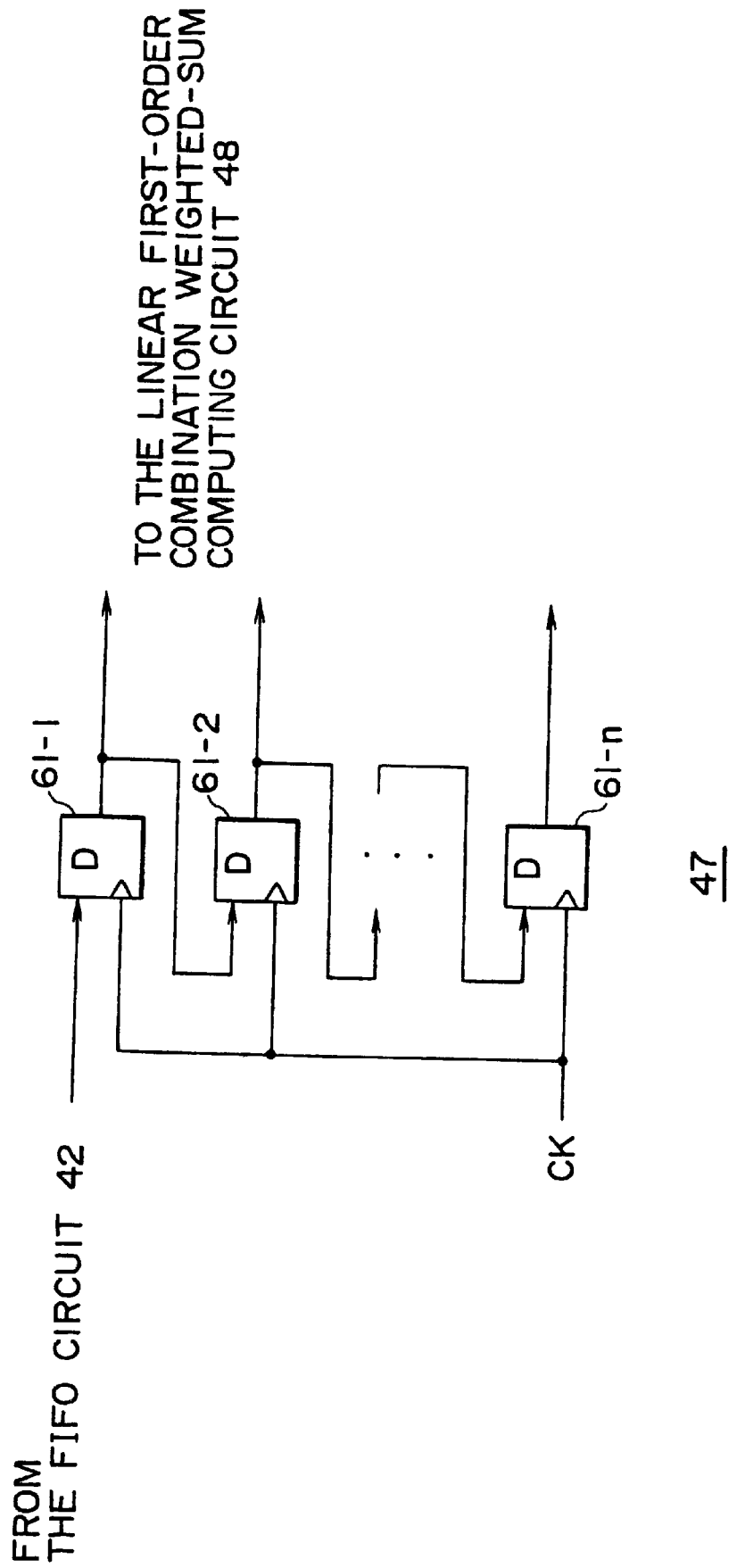
FIG. 4 is a block diagram showing the configuration of an embodiment implementing a blocking circuit 47 employed in the time-axis correction circuit 32 shown in FIG. 2.

FIG. 4 is a block diagram showing the configuration of an embodiment implementing the blocking circuit 47 of FIG. 2. As shown in the figure, a clock signal CK is supplied to the clock input pin of each of delay circuits 61-1 to 61-n. A video signal generated by the FIFO circuit 42 is supplied to the signal input pin of the delay circuit 61-1. Supplied to the signal input terminal of each of the delay circuits 61-2 to 61-n is a signal output by each of the preceding delay circuits 61-1 to 61-(n-1) respectively. A total of n signals output at the taps of the n delay circuits 61-1 to 61-n are output to the linear first-order combination weighted-sum computing circuit 48 shown in FIG. 2 as block pixel signals of one block. In this way, signals sequentially delayed by one clock period one after another by the delay circuits 61-1 to 61-n in accordance with the clock signal CK are supplied to the linear first-order combination weighted-sum computing circuit 48 shown in FIG. 2.

Figure 5:
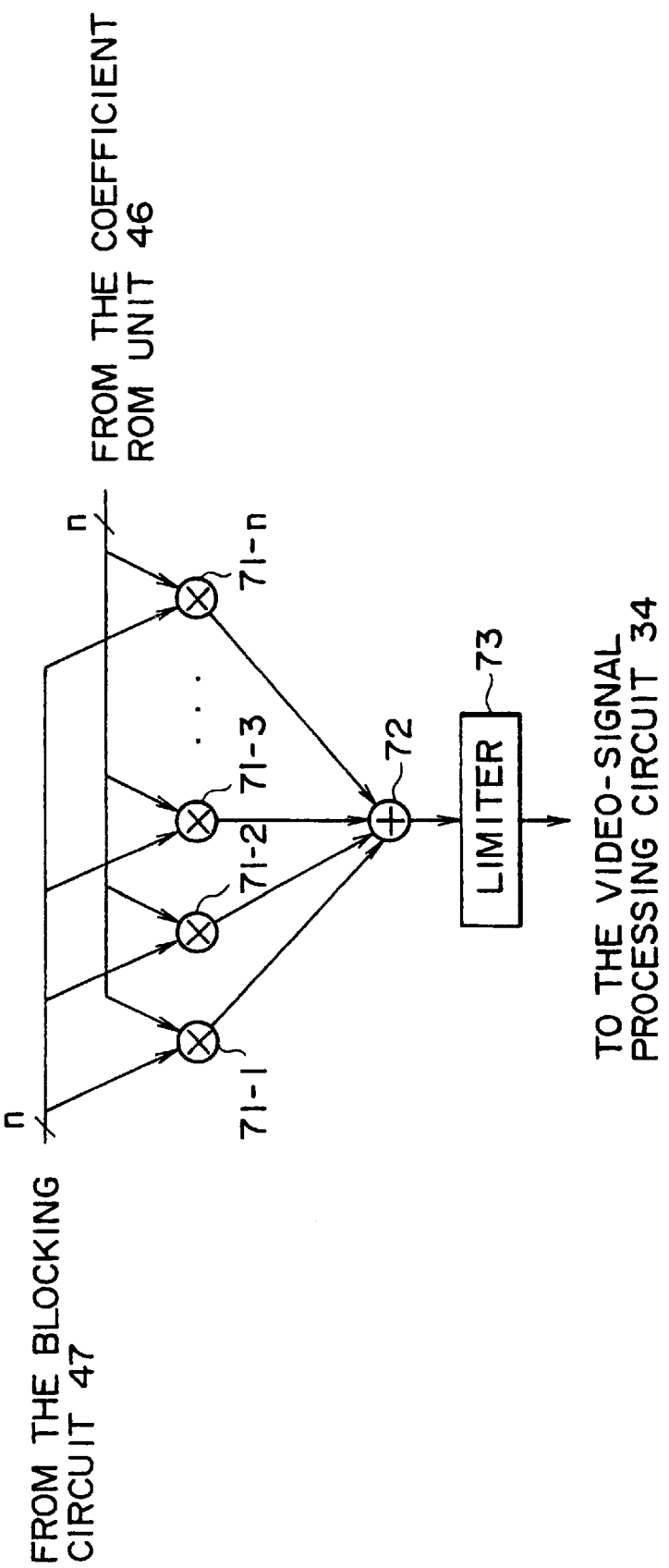
FIG. 5 is a block diagram showing the configuration of an embodiment implementing a linear first-order combination weighted-sum computing circuit 48 employed in the time-axis correction circuit 32 shown in FIG. 2.

FIG. 5 is a block diagram showing the configuration of an embodiment implementing the linear first-order combination weighted-sum computing circuit 48 of FIG. 2.

As shown in the figure, a set of predetermined coefficients read out from the coefficient ROM unit 46 are each supplied to one of multiplication circuits 71-1 to 71-n for the n delay-circuit taps. The block pixel signals output by the blocking circuit 47 are also supplied to the respective multiplication circuits 71-1 to 71-n.

The multiplication circuits 71-1 to 71-n each multiply the value of a block pixel signal by a corresponding coefficient in the set supplied thereto, supplying the product resulting from the multiplication to an addition circuit 72. The addition circuit 72 adds up all the products for a block, that is, all the pixel values multiplied by their respective predetermined coefficients for the block, in order to produce a video signal compensated for its jitters or a video signal with a reduced number of jitters which is then supplied to a limiter 73. The limiter 72 limits the level of the video signal supplied thereto to a value in a predetermined range before converting the video signal into an analog one. The analog video signal resulting from the conversion is then supplied to the video-signal processing circuit 34 shown in FIG. 1 as an output video signal.

Figure 6:
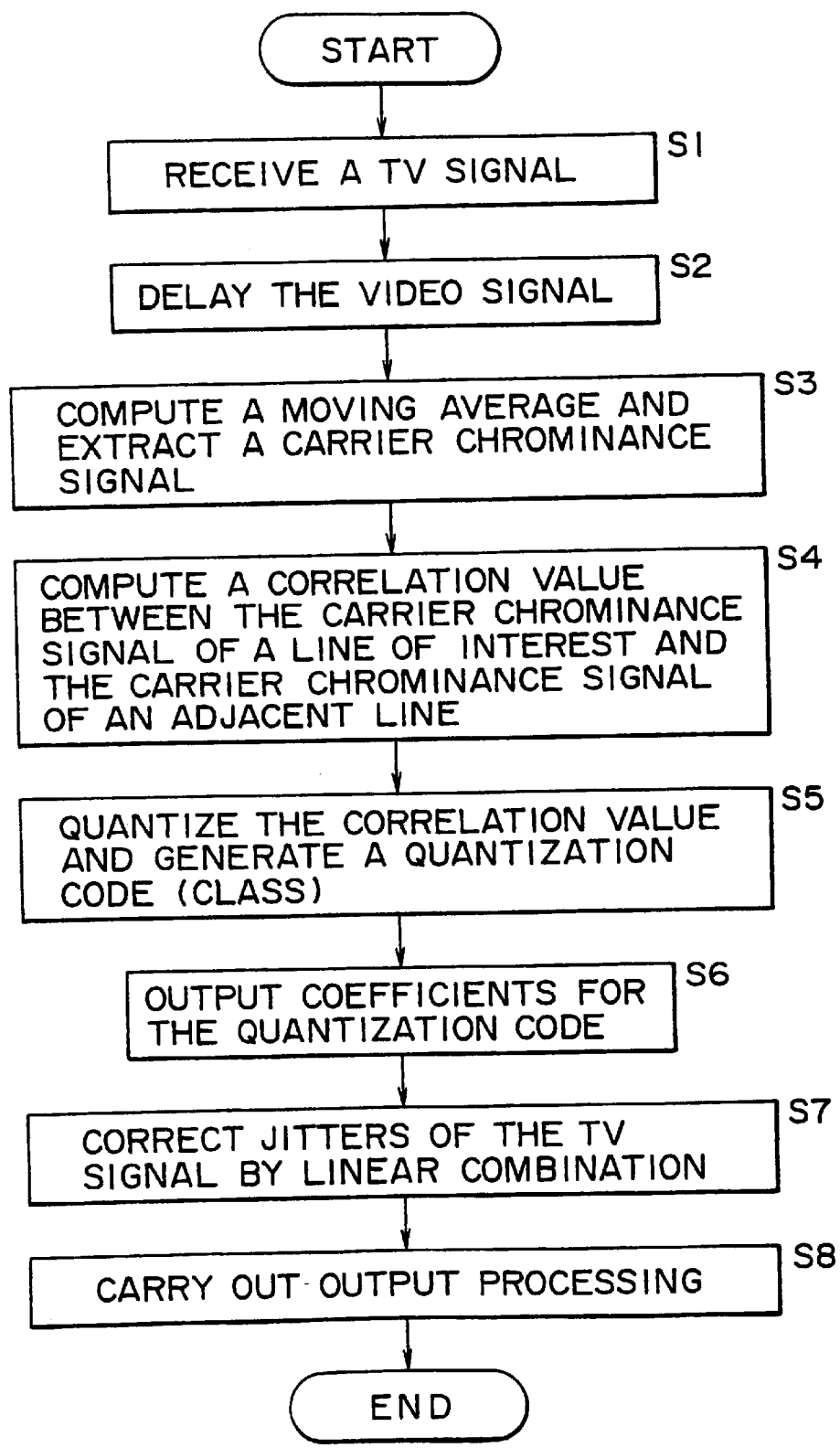
FIG. 6 is a flowchart used for explaining processing operations of the TV receiver 21 shown in FIG. 1.

Next, processing operations carried out by the TV receiver 21 are explained by referring to a flowchart shown in FIG. 6.

As shown in the figure, the flowchart begins with a step S1 at which a TV signal broadcasted by a TV broadcasting station is received by the antenna 22. Then, a desired TV broadcasting channel is selected by the tuner 31.

The flow of processing then goes on to a step S2 at which the tuner 31 supplies an audio signal to the audio-signal processing circuit 33 and a video signal to the time-axis correction circuit 32 shown in FIG. 1. The video signal generated by the tuner 31 is supplied to the moving-average correction circuit 41 and the FIFO circuit 42 employed in the time-axis correction circuit 32. It should be noted that the video signal is first of all converted into a digital video signal by an A/D (Analog-to-Digital) conversion circuit not shown in the figure before being supplied to the moving-average correction circuit 41 and the FIFO circuit 42 and it is actually the digital video signal resulting from the A/D conversion that is supplied to the moving-average correction circuit 41 and a FIFO circuit 42. The FIFO circuit 42 delays the digital video signal supplied thereto by a period up to a point of time at which the set of coefficients for the delay-circuit taps are read out from the coefficient ROM unit 46.

Then, the flow of processing proceeds to a step ST3 at which the moving-average computing circuit 51 employed in the moving-average correction circuit 41 computes an average value of video signals of 4 m consecutive pixels where m is an integer 1, 2, ... representing the number of sampling operations. When the average value of video signals of 4 m consecutive pixels is supplied to the subtraction circuit 53, the delay circuit 52 outputs data of a pixel at the center of the 4 m pixels to the subtraction circuit 53. The subtraction circuit 53 computes the difference between the average value and the data of the center pixel in order to extract a carrier chrominance signal which is then supplied to the addition circuit 54.

To put it in detail, pieces of data of consecutive pixels pertaining to the same line of a predetermined field are a repeated series of Y−I, Y−Q, Y+I and Y+Q where notations Y, I and Q denote the values of luminance data, an I signal and a Q signal respectively. Thus, pieces of data of four consecutive pixels are, for example, Y−I, Y−Q, Y+I and Y+Q, the average value is Y. Subtracting Y−Q of the center pixel of the four consecutive pixels from the average value Y results in Q. Thus, by taking the resulting value as a base, data of the Q signal can be found. By carrying out the same processing on four consecutive pixels having pieces of data Y−Q, Y+I, Y+Q and Y−I, data of the I signal can be found. In this way, by finding a moving average and subtracting data of a predetermined pixel from the moving average, a carrier chrominance signal can be extracted.

The addition circuit 54 adds a signal with a level of 128 to the extracted carrier chrominance signal to produce a carrier chrominance signal at a level in the range 0 to 255 which is then supplied to the FIFO circuit 43 and the correlation-value computing circuit 44.

Then, the flow of processing continues to a step S4 at which the FIFO circuit 43 delays the carrier chrominance signal supplied by the moving-average correction circuit 41 by a time corresponding to one line, outputting the delayed carrier chrominance signal to the correlation-value computing circuit 44. The correlation-value computing circuit 44 computes a correlation value between a carrier chrominance signal supplied by the moving-average correction circuit 41 and a delayed carrier chrominance signal supplied by the FIFO circuit 43, supplying the correlation value to a quantization circuit 45.

Subsequently, the flow of processing goes on to a step S5 at which the quantization circuit 45 shifts the correlation value supplied by the correlation-value computing circuit 44 to a proper level and then converts it into an integer quantization code (or a class code) by carrying out rounding processing, outputting the quantization code to the coefficient ROM unit 46. That is to say, the quantization code is found as a class (a class code) for the correlation value.

Then, the flow of processing proceeds to a step S6 at which the coefficient ROM unit 46 outputs a set of coefficients for the delay-circuit taps stored at addresses indicated by the quantization code (class code) supplied from the quantization circuit 45 to the linear first-order combination weighted-sum computing circuit 48.

A method for generating (a method of learning) a set of coefficients for each class stored in the coefficient ROM unit 46 is explained by referring to FIGS. 7, 14 and 8 as follows.

Figure 7:
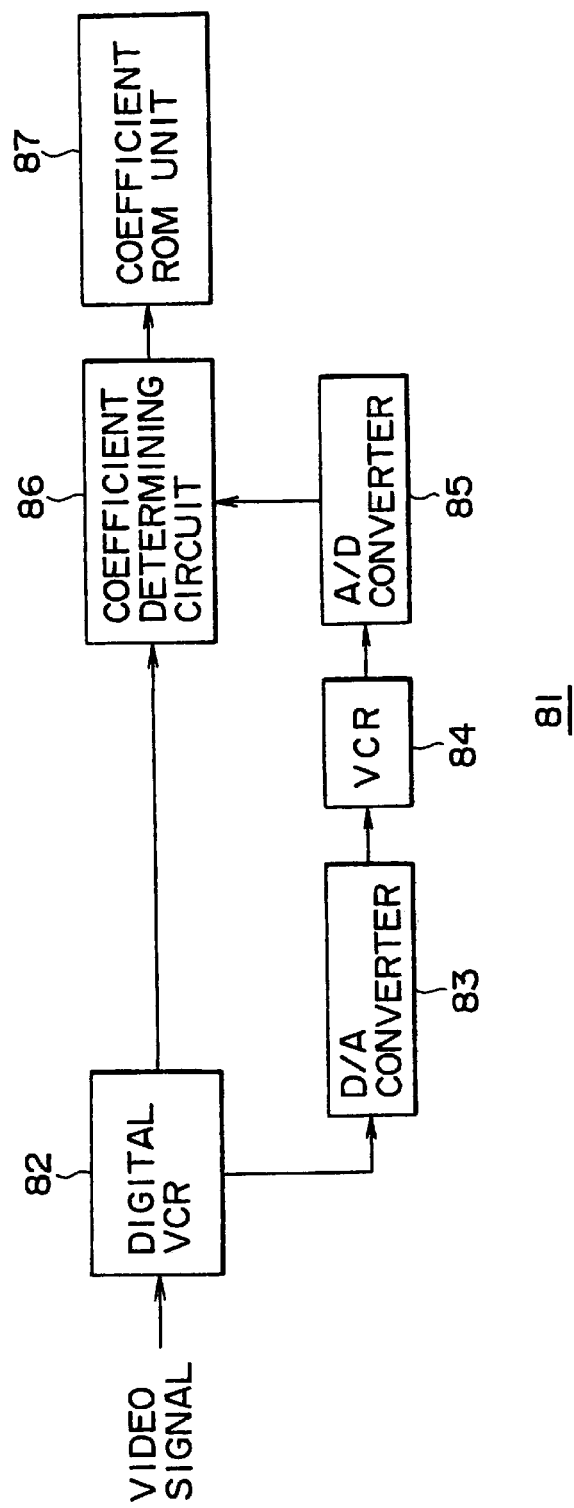
FIG. 7 is a block diagram showing the configuration of an embodiment implementing a processing apparatus 81 for generating a set of coefficients for each class stored in a coefficient ROM unit 46.

FIG. 7 is a block diagram showing the configuration of an embodiment implementing a processing apparatus 81 for generating a set of coefficients for each class stored in the coefficient ROM unit 46.

As shown in the figure, a reference learning-purpose video signal for generating a set of coefficients for each class is recorded in a digital VCR 82 which does not generate jitters in an operation to play back the video signal. The digital video signal played back by the digital VCR 82 is then converted by a D/A converter 83 into an analog video signal to be recorded in a VCR 84 for consumer applications.

Then, a predetermined sequence of analog video signal with jitters played back by the VCR 84 is converted by an A/D converter 85 into a digital video signal which is supplied to a coefficient determining circuit 86. At that time, a digital video signal having the same sequence as that generated by the VCR 84 is supplied to the coefficient determining circuit 86 also from the digital VCR 82. The coefficient determining circuit 86 finds a class (or a class code) from the video signal (the digital video signal) with jitters supplied from the VCR 84. By using the video signal (the digital video signal) with jitters supplied from the VCR 84 and the digital video signal with no jitters supplied by the digital VCR 82, normal equations (or linear first-order combination equations) are established for a class. Then, a least-square method is applied to the normal equations established for the class and the normal equations for the class are solved by using a matrix-solution technique to find a set of predicted coefficients for the class. The set of predicted coefficients for the class are then stored in the coefficient ROM unit 46.

To put it in detail, the coefficient determining circuit 86 finds a correlation value between carrier chrominance signals of two predetermined lines (scanning lines) for all video signals (digital video signals) supplied from the VCR 84 during a learning period for finding a set of coefficients for each class. The correlation value is quantized, that is, the correlation value is converted into a quantization code (class code) for determining the class for a video signal (of a pixel of interest for example) supplied from the VCR 84. Then, for a determined class, predetermined normal equations (linear first-order combination equations) for finding pixels of interest of the video signals (the digital video signals supplied by the digital VCR 82) are generated by using the video signals supplied by the VCR 84 and the video signals supplied by the digital VCR 82. Then, a least-square method is applied to the normal equations established for the class. By solving a plurality of normal equations established for a class using a matrix-solution technique, a set of coefficients can be found for the class.

Figure 8:
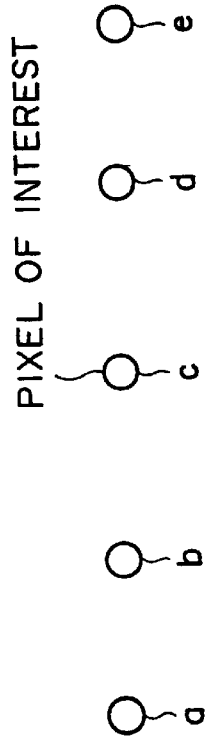
FIG. 8 is a diagram used for explaining a technique for computing a signal value for a pixel of interest on a predetermined line.
Figure 14:
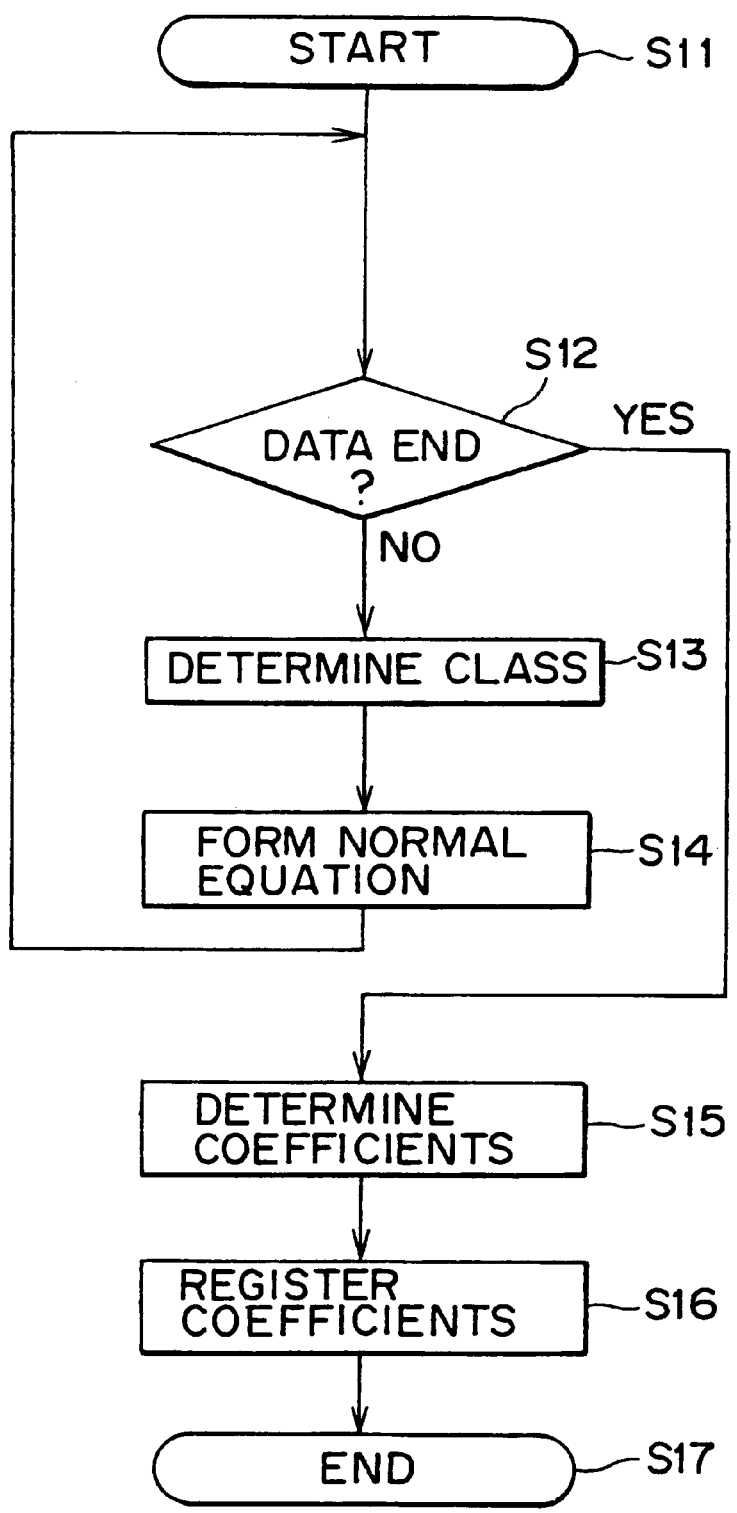
FIG. 14 is a flowchart used for explaining processing operations for generating a set of coefficients for each class stored in the coefficient ROM unit 46.

Operations to establish a set of coefficients for a class are explained concretely in detail by referring to a flowchart shown in FIGS. 14 and 8. As shown in the figures, the flowchart begins with a step S11 at which processing to generate (processing to learn) a set of coefficients for a class is started. The flow of processing then goes on to a step S12 at which processing to form a judgment on data completion is carried out. To put it in detail, processing is carried out at the step S12 to form a judgment as to whether or not all video signals for the processing to generate (processing to learn) coefficients have been processed. If all video signals for the processing to generate (processing to learn) coefficients have not been processed, the flow of processing then goes on to a step S13 to carry out class determination processing. In order to determine a class for a video signal (of a pixel of interest) supplied by the VCR 84 at the step S13, the same processing as the processing operations shown in FIG. 2 to determine a quantization code (class code) is executed. That is to say, a correlation value between a carrier chrominance signal for a predetermined line of a predetermined field of a video signal (digital video signal) supplied by the VCR 84 and a carrier chrominance signal for a line delayed by a time corresponding to one line is computed and the computed correlation value is then quantized to determine the quantization code (class code). Since the details of the processing are the same as the processing operations shown in FIG. 2 to determine a quantization code (class code), their explanation is omitted.

In the processing described above, a class code (a quantization code) is determined. The flow of processing then goes on to a step S14 to carry out processing to generate normal equations. To put it in detail, at the step S14, a digital video signal (a teaching video signal) supplied by the digital VCR 82 and video signals (digital video signals) supplied by the VCR 84 are used for generating a normal equation to be described later for the class code determined in the processing at the preceding step S13. The flow of processing then returns to the step S12. Such pieces of processing are carried out for all video signals. As the pieces of processing for all the video signals are completed, the flow of processing proceeds to a step S15.

At the step S15, as will be described, the normal equations for a class are solved by a matrix technique to find a set of coefficients for the class. Then, the flow of processing continues to a step S16 to carry out coefficient storing processing. To put it in detail, at the step S16, the set of coefficients for a class is stored in the coefficient ROM unit 46. Subsequently, the flow of processing goes on to a step S17 to terminate the processing to generate (the processing to learn) a set of coefficients for a class.

The flow chart shown in FIG. 14 is used to explain in more detail the processing to generate a normal equation and the processing to determine coefficients carried out at the steps S14 and S15 respectively.

Assume that pixels a to e be pixels constituting a predetermined line as shown in FIG. 8. In this case, during a predetermined learning period, for each of classes (class codes) resulting from classification based on correlation values calculated by using the method described above, video signals (digital video signals) supplied from the VCR 84 and digital video signals (teaching video signals) supplied by the digital VCR 82 to represent signal values of pixels of interest are stored as matrices X and Y respectively.

$$X = \begin{bmatrix} X11 & X12 & X13 & X14 & X15 \\ X21 & X22 & X23 & X24 & X25 \\ X31 & X32 & X33 & X34 & X35 \\ & & \cdots & & \\ Xn1 & Xn2 & Xn3 & Xn4 & Xn5 \end{bmatrix} \quad (1)$$

$$Y = \begin{bmatrix} Y1 \\ Y2 \\ Y3 \\ \vdots \\ Yn \end{bmatrix} \quad (2)$$

To put it in detail, a row of the matrix X represents a set of pieces of predetermined input data (of a normal equation) and the number of rows is equal to the number of samples stored during a learning period. For example, matrix elements on the first row in the matrix X are x11, x12, x13, x14 and x15 which represent pieces of data of the pixels a to e (or pieces of pixel data). The set of pieces of pixel data on a row represents input data. On the other hand, a row of the matrix Y represents a teaching signal and the number of rows is equal to the number of samples stored during a learning period. In the case of Eqs. (1) and (2), for example, n sets of input data classified into a predetermined class, where n>>5, are stored as samples during the learning period.

The values of elements (that is, the coefficients described above) of a matrix W expressed by Eq. 3 are determined by using the least-square method in such a way that the sum of squared errors of an equation Y=XW is minimized.

$$W = \begin{bmatrix} W1 \\ W2 \\ W3 \\ W4 \\ W5 \end{bmatrix} \quad (3)$$

A method for finding the values of the elements of the matrix W is described briefly as follows. Consider an error matrix E expressed by Eq. 4.

$$E = \begin{bmatrix} e1 \\ e2 \\ e3 \\ \vdots \\ en \end{bmatrix} \quad (4)$$

Therefore, in the remainder equation XW=Y+E, the most probable values of matrix elements Wi (where i=1 to 5) are found as values that minimize Expression 5 by using the least-square method.

$$\sum_{i=1}^{n} e_i^2 \quad (5)$$

Thus, according to the stationary principle, by finding the matrix elements Wi (where i=1 to 5) that make Eq. 6 and, hence, Eq. 7 hold true, the matrix W of the coefficients having the most probable values can be generated.

$$\frac{\partial}{\partial w_j}\left[\sum_{i=1}^{n} e_i^2\right] = 0 \quad (j = 1, 2, 3, 4, 5) \quad (6)$$

$$e_1 \frac{\partial e_1}{\partial w_j} + e_2 \frac{\partial e_2}{\partial w_j} + \ldots e_n \frac{\partial e_n}{\partial w_j} = 0 \quad (j = 1, 2, 3, 4, 5) \quad (7)$$

Here, taking partial differentials of both the sides of the remainder equation XW=Y+E with respect to the matrix elements Wi (where i=1 to 5) yields Eqs. 8-1 to 8-5.

$$\frac{\partial e_i}{\partial w_1} = x_{i1} \quad (8\text{-}1)$$

$$\frac{\partial e_i}{\partial w_2} = w_{i2} \quad (8\text{-}2)$$

$$\frac{\partial e_i}{\partial w_3} = w_{i3} \quad (8\text{-}3)$$

$$\frac{\partial e_i}{\partial w_4} = w_{i4} \quad (8\text{-}4)$$

$$\frac{\partial e_i}{\partial w_5} = w_{i5} \quad (8\text{-}5)$$

$$(i = 1, 2, 3, \ldots, n)$$

Thus, by substituting Eqs. 8-1 to 8-5 to Eq. 7, Eq. 7 can be rewritten into Eqs. 9-1 to 9-5.

$$\sum_{i=1}^{n} e_i x_{i1} = 0 \quad (9\text{-}1)$$

$$\sum_{i=1}^{n} e_i x_{i2} = 0 \quad (9\text{-}2)$$

$$\sum_{i=1}^{n} e_i x_{i3} = 0 \quad (9\text{-}3)$$

$$\sum_{i=1}^{n} e_i x_{i4} = 0 \quad (9\text{-}4)$$

$$\sum_{i=1}^{n} e_i x_{i5} = 0 \quad (9\text{-}5)$$

By substituting Eqs. 9-1 to 9-5 to the remainder equation XW=Y+E, normal equations expressed by Eqs. 10-1 to 10-5 can be obtained.

$$\left(\sum_{j=1}^{n} x_{j1}x_{j1}\right)w_1 + \left(\sum_{j=1}^{n} x_{j1}x_{j2}\right)w_2 + \ldots \left(\sum_{j=1}^{n} x_{j1}x_{j5}\right)w_5 = \left(\sum_{j=1}^{n} x_{j1}y_j\right) \quad (10\text{-}1)$$

$$\left(\sum_{j=1}^{n} x_{j2}x_{j1}\right)w_1 + \left(\sum_{j=1}^{n} x_{j2}x_{j2}\right)w_2 + \ldots \left(\sum_{j=1}^{n} x_{j2}x_{j5}\right)w_5 = \left(\sum_{j=1}^{n} x_{j2}y_j\right) \quad (10\text{-}2)$$

$$\left(\sum_{j=1}^{n} x_{j3}x_{j1}\right)w_1 + \left(\sum_{j=1}^{n} x_{j3}x_{j2}\right)w_2 + \ldots \left(\sum_{j=1}^{n} x_{j3}x_{j5}\right)w_5 = \left(\sum_{j=1}^{n} x_{j3}y_j\right) \quad (10\text{-}3)$$

$$\left(\sum_{j=1}^{n} x_{j4}x_{j1}\right)w_1 + \left(\sum_{j=1}^{n} x_{j4}x_{j2}\right)w_2 + \ldots \left(\sum_{j=1}^{n} x_{j4}x_{j5}\right)w_5 = \left(\sum_{j=1}^{n} x_{j4}y_j\right) \quad (10\text{-}4)$$

$$\left(\sum_{j=1}^{n} x_{j5}x_{j1}\right)w_1 + \left(\sum_{j=1}^{n} x_{j5}x_{j2}\right)w_2 + \ldots \left(\sum_{j=1}^{n} x_{j5}x_{j5}\right)w_5 = \left(\sum_{j=1}^{n} x_{j5}y_j\right) \quad (10\text{-}5)$$

Eqs. 10-1 to 10-5 are five simultaneous equations including five unknown variables w1, w2, w3, w4 and w5. By solving these equations using, for example, the sweep-out technique, the values of the elements of the matrix W, that is, the values of the coefficients, can be found. The values of the coefficients found in this way are then stored in the coefficient ROM unit 46.

The description returns to the flowchart shown in FIG. 6. At the step S6, the set of coefficients for a class generated (classified) at the step S5 is supplied to the linear first-order combination weighted-sum computing circuit 48. The flow of processing then goes on to a step S7 at which a video signal output by the FIFO circuit 42 is supplied to the blocking circuit 47. Block pixel signals of a plurality of pixels, which are generated at the taps of the delay circuits 61-1 to 61-n employed in the blocking circuit 47, are supplied to the linear first-order combination weighted-sum computing circuit 48. The multiplication circuits 71-1 to 71-n employed in the linear first-order combination weighted-sum computing circuit 48 multiply the coefficients for the delay-circuit taps read out from the coefficient ROM unit 46 by the respective block pixel signals supplied by the blocking circuit 47, outputting the products to the addition circuit 72. The addition circuit 72 sums up the products supplied thereto, supplying the sum to the limiter 73.

Assume, for example, that the signal value of a pixel c of interest is to be found in the case of a line shown in FIG. 8. In this case, block pixel signals of pixels a to e supplied from the blocking circuit 47 are multiplied by coefficients for the pixels a to e read out from the coefficient ROM unit 46. Products resulting from the multiplication are then supplied to the limiter 73. Speaking concretely, let the coefficients for the pixels a to e be 0, 0, 1, 0 and 0 respectively and the block pixel signals of the pixels a to e be A, B, C, D and E respectively. In this case, the signal value of the pixel c of interest is 0*A+0*B+1*C+0*D+0*E. This signal value is supplied to the limiter 73. If the coefficients for the pixels a to e are 0, 1, 0, 0 and 0 respectively, the signal value of the pixel c of interest is 0*A+1*B+0*C+0*D+0*E. In this way, by using coefficients stored in the coefficient ROM unit 46, a predetermined line of the video signal can be advanced or delayed by a predetermined time.

The sum video signal produced by the addition circuit 72 is limited by the limiter 73 to a value in the range of the signal level thereof before being supplied to a D/A converter not shown in the figure. At the D/A converter, the video signal is converted into an analog video signal which is then supplied to the video-signal processing circuit 34. In this way, the video signal compensated for jitters thereof is generated.

The flow of processing then proceeds to a step S8 at which a video signal output by the time-axis correction circuit 32 undergoes pieces of predetermined processing such as demodulation and amplification in the video-signal processing circuit 34 before being supplied to the CRT 36. On the other hand, the audio signal output by the tuner 31 undergoes pieces of predetermined processing such as demodulation and amplification in the audio-signal processing circuit 33 before being supplied to the speaker 35.

Figure 9:
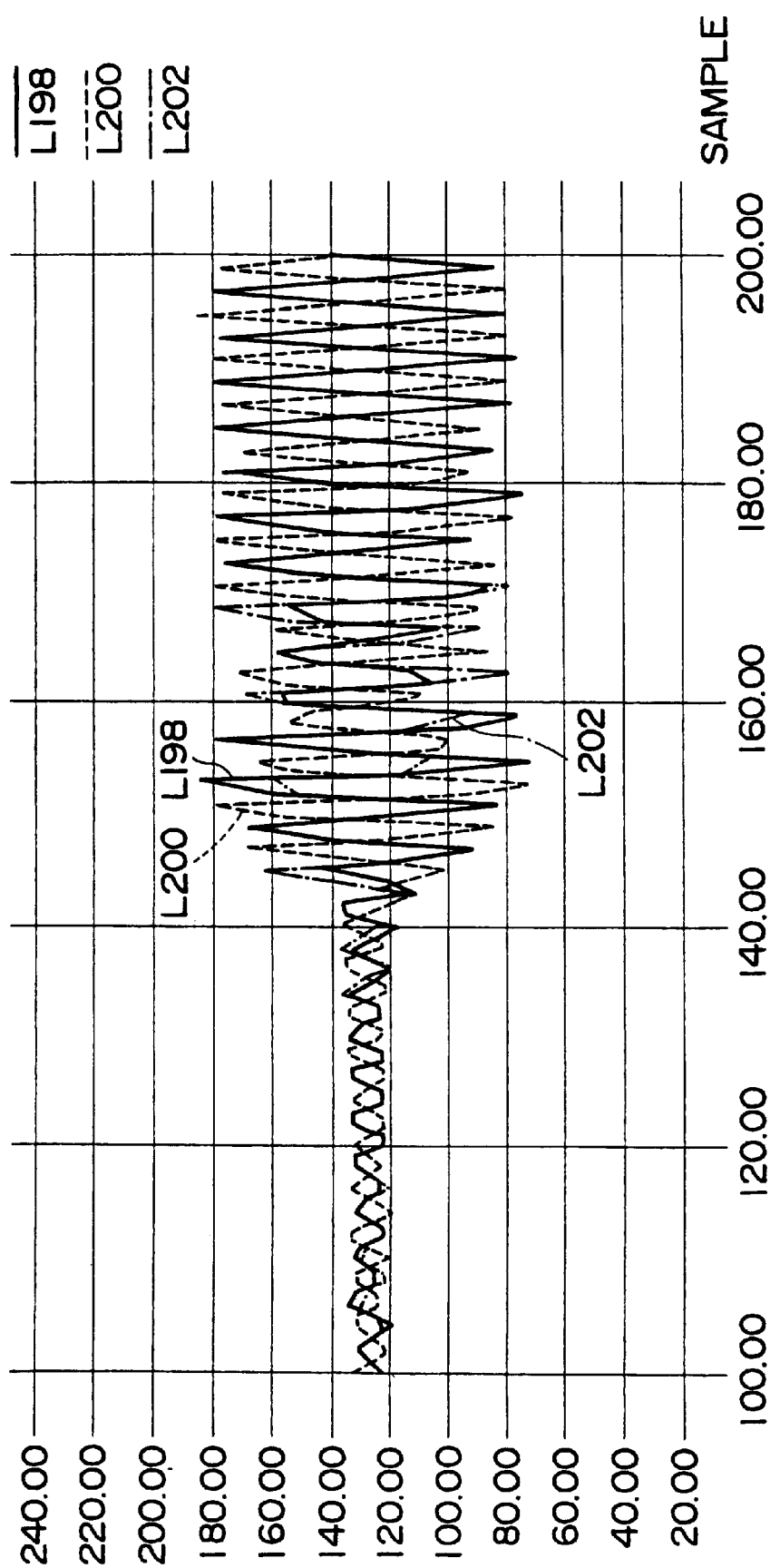
FIG. 9 is plotted graphs showing a TV signal for predetermined scanning lines corrected by the time-axis correction circuit 32.
Figure 12:
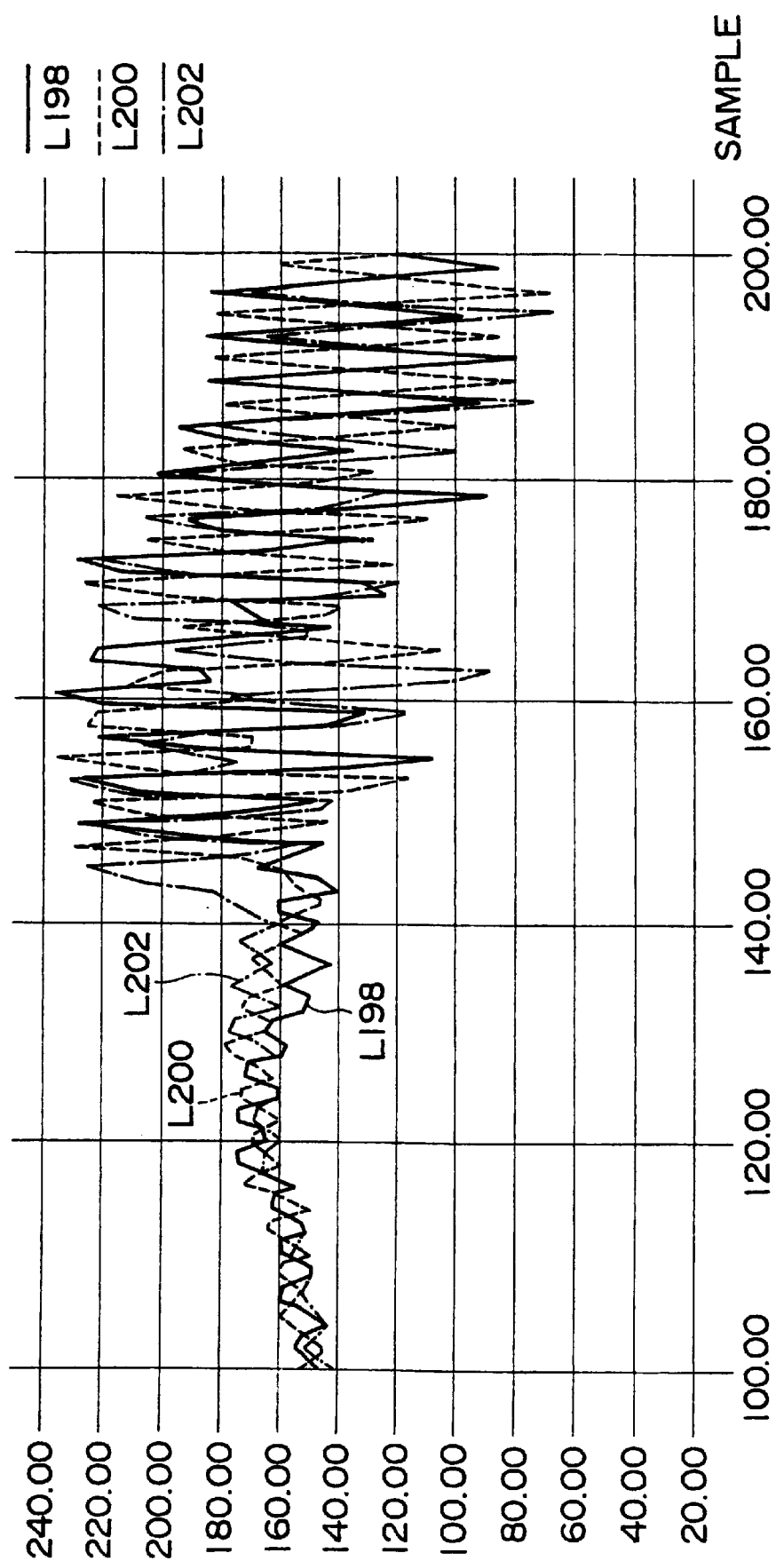
FIG. 12 is plotted graphs showing a TV signal for predetermined scanning lines including jitters.

FIG. 9 is plotted graphs showing a TV signal with carrier chrominance signals corrected by the time-axis correction circuit 32 as is the case with one shown in FIG. 12. In the figure, 198th, 200th and 202nd lines of carrier chrominance signal in a predetermined field are shown as a solid line, a fine dotted line and a dotted dashed line respectively.

The correlation value between the carrier chrominance signals of the 198th and 202nd lines, the correlation value between the carrier chrominance signals of the 198th and 200th lines, and the correlation value between the carrier chrominance signals of the 200th and 202nd lines shown in the figure are found to be 0.968523, −0.968028 and −0.972247 respectively. In comparison with the correlation values between carrier chrominance signals shown in FIG. 12, those shown in FIG. 9 have greater absolute correlation values which indicate that the carrier chrominance signals output by the time-axis correction circuit 32 are signals with a reduced number of jitters capable of displaying high-quality pictures.

Figure 10:
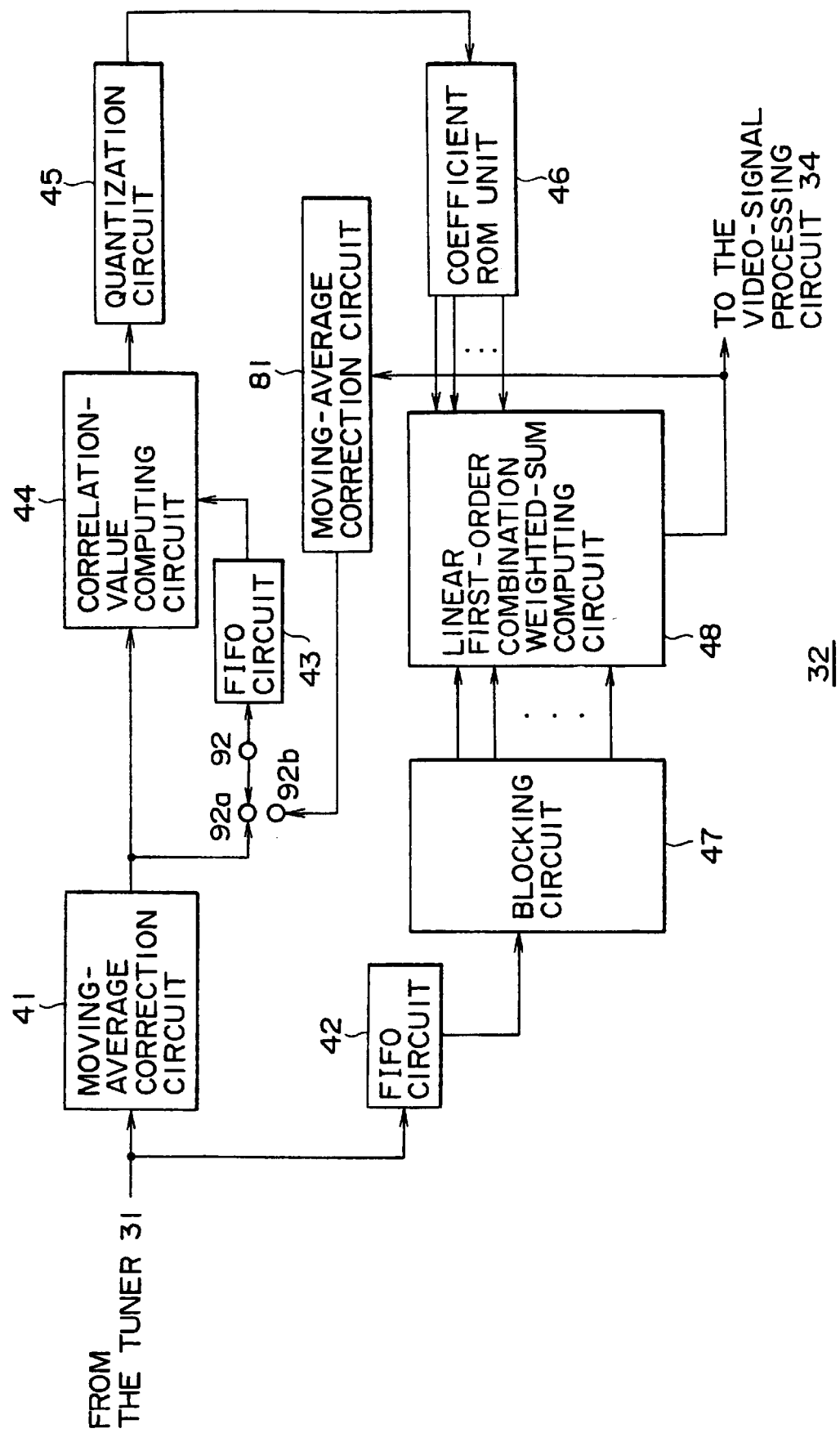
FIG. 10 is a block diagram showing the configuration of another embodiment implementing a time-axis correction circuit 32 provided by the present invention.

FIG. 10 is a block diagram showing the configuration of another embodiment implementing a time-axis correction circuit 32 provided by the present invention. Components of FIG. 10 identical with those shown in FIG. 2 are denoted by the same reference numerals as those used in the latter figure and their explanation is omitted if deemed unnecessary.

In the time-axis correction circuit 32 shown in FIG. 10, when a switch 92 is connected to a terminal 92b thereof, a digital video signal output by the linear first-order combination weighted-sum computing circuit 48 is again supplied to a moving-average correction circuit 81 for extracting a luminance component by carrying out the same processing operations as the moving-average correction circuit 41 described earlier. The extracted luminance component is supplied to the FIFO circuit 43 by way of the switch 92. That is to say, the switch 92 is connected to a terminal 92a thereof only during the processing of the first line, being switched over to the terminal 92b for the processing of the second and subsequent lines. Thus, during the processing to find correlation values for the second and subsequent lines, the carrier chrominance signal of the immediately preceding line which has completed processing to correct jitters is delayed by a time corresponding to one line by the FIFO circuit 43. A correlation value is thus found by comparison with this carrier chrominance signal, a carrier chrominance signal completing correction of jitters. It should be noted that since processing operations carried out by the time-axis correction circuit 32 shown in FIG. 10 are the same as those of the time-axis correction circuit 32 shown in FIG. 2, their explanation is omitted.

Figure 11:
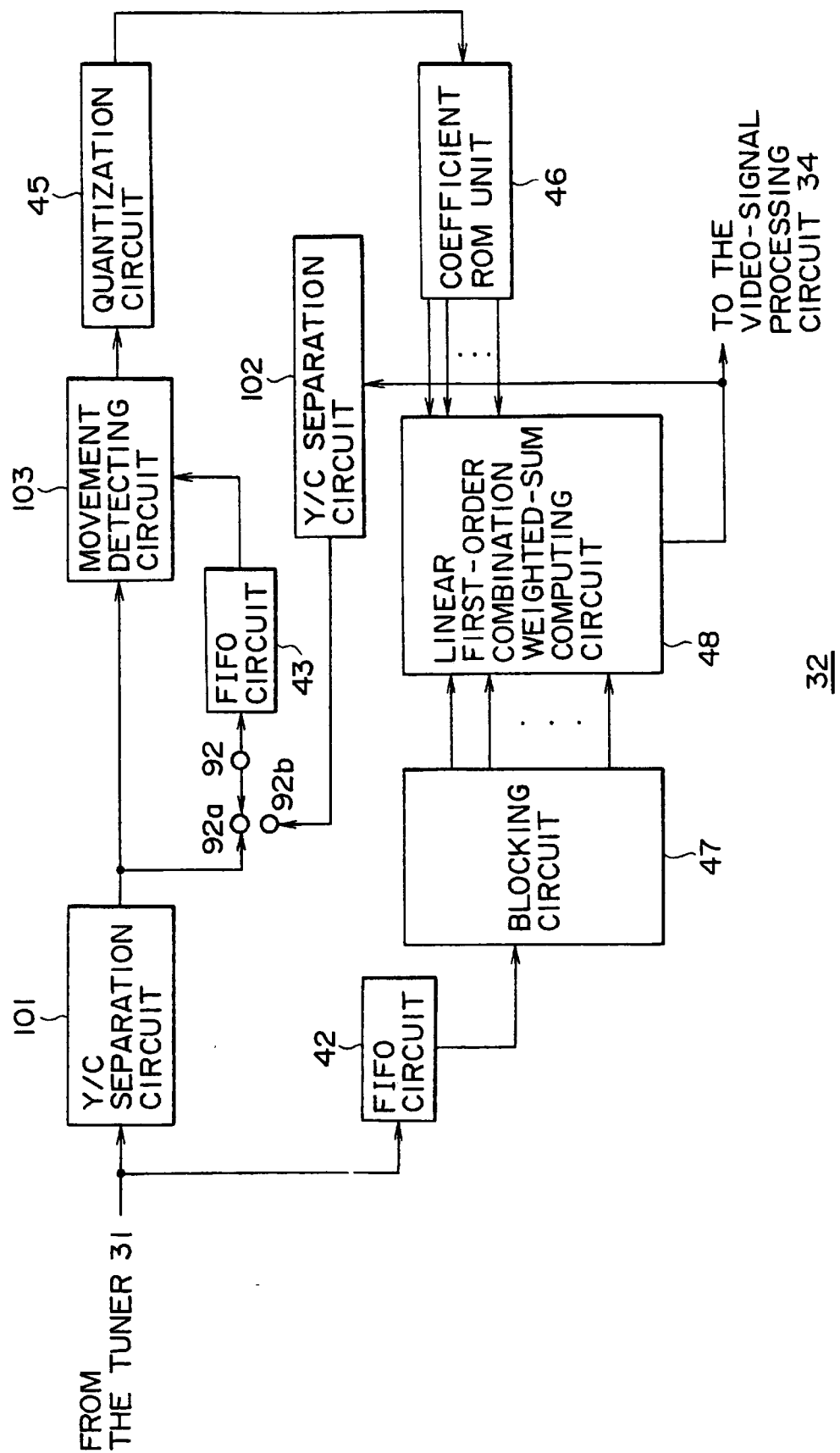
FIG. 11 is block diagram showing the configuration of still another embodiment implementing a time-axis correction circuit 32 provided by the present invention.

FIG. 11 is a block diagram showing the configuration of still another embodiment implementing a time-axis correction circuit 32 provided by the present invention. Components of FIG. 11 identical with those shown in FIG. 10 are denoted by the same reference numerals as those used in the latter figure and their explanation is omitted if deemed unnecessary.

The time-axis correction circuit 32 shown in FIG. 11 comprises Y/C separation circuits 101 and 102 in place of the moving-average correction circuits 41 and 81 respectively shown in FIG. 10. In addition, the time-axis correction circuit 32 shown in FIG. 11 includes a movement detecting circuit 103 in place of the correlation-value computing circuit 44 employed the time-axis correction circuit 32 shown in FIG. 10. The rest of the configuration is the same as the time-axis correction circuit 32 shown in FIG. 10.

Since there is much correlation between a line and a line adjacent thereto if the number of jitters is small, the relative movement between the two lines is small. In other words, if the number of jitters is large, the correlation is little, increasing the relative movement. Thus, the correlation between two adjacent lines, that is, the number of jitters, can be evaluated from the relative movement. The embodiment shown in FIG. 11 is based on this principle.

In the time-axis correction circuit 32 shown in FIG. 11, a luminance signal (the Y signal) is separated by the Y/C separation circuit 101 or 102 and supplied to the FIFO circuit 43 by way of the movement detecting circuit 103 and the switch 92. It should be noted that, much like the time-axis correction circuit shown in FIG. 10, only in the case of the first line is the luminance signal supplied to the FIFO circuit 43 from the Y/C separation circuit 101. During the processing to compute correlation values for the second and subsequent lines, a luminance signal which has already completed the processing to correct jitters is supplied to the FIFO circuit 43 from the Y/C separation circuit 102 instead of the Y/C separation circuit 101. The movement detecting circuit 103 detects the movement of the luminance signal supplied from the Y/C separation circuit 101 and the movement of a luminance signal from the FIFO circuit 43 leading ahead of the luminance signal from the Y/C separation circuit 101 by one line. The movement is big if the number of jitters is large and small if the number of jitters is small. Thus, by reading out coefficients for the movements (correlation) from the coefficient ROM unit 46, the same operations as those described earlier can be implemented. Note that it is needless to say that the Y/C separation circuits and the movement detecting circuit are used to identify a class which is determined at the time a set of coefficients stored in the coefficient ROM unit 46 for each class are found in a learning process.

Figure 13:
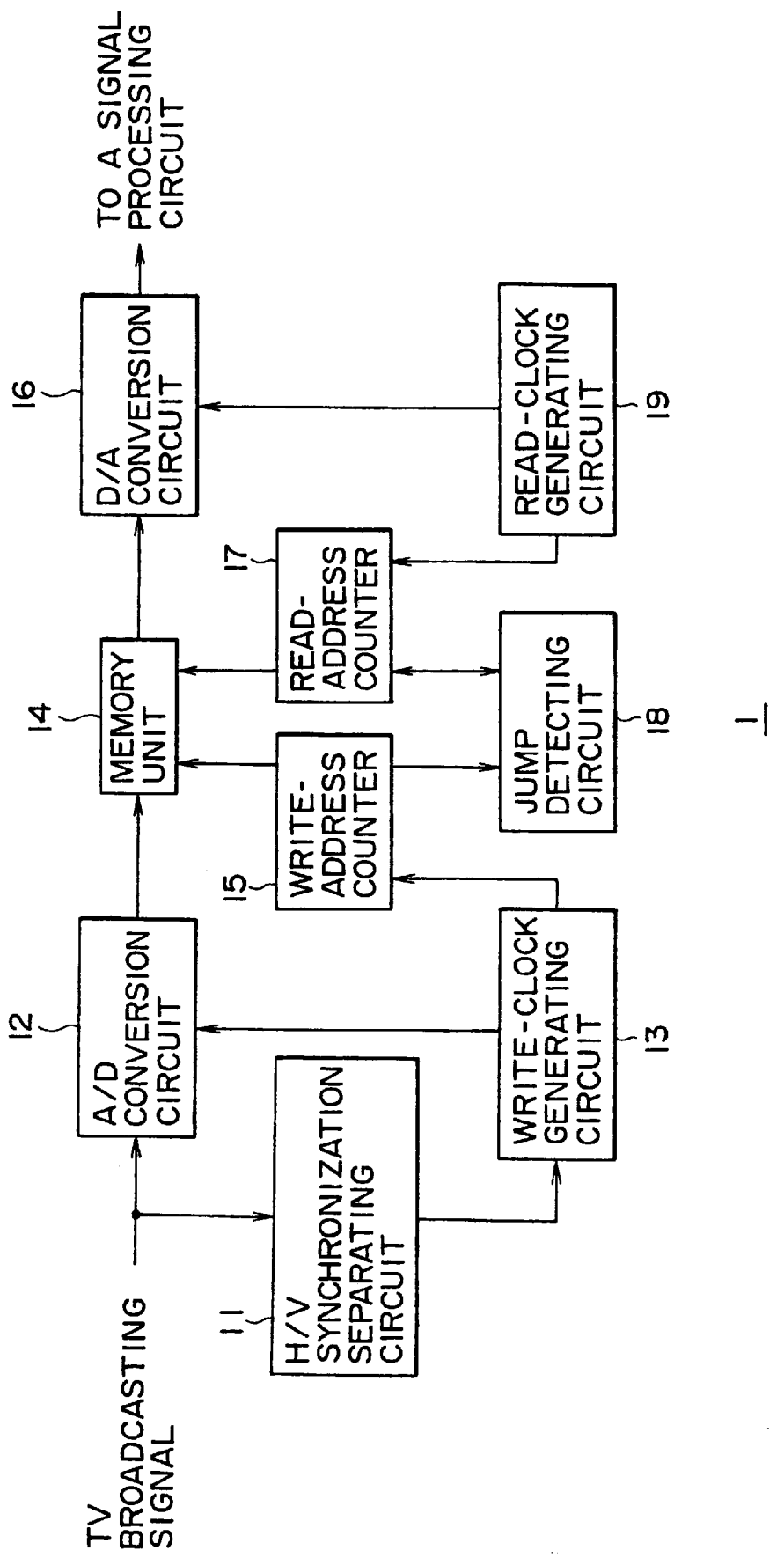
FIG. 13 is a block diagram showing an example of the configuration of the related art TBC.

In this way, the number of jitters contained in a TV signal can be reduced without using the related art TBC 1 with a configuration shown in FIG. 13.

In addition, the time-axis correction circuit shown in FIG. 1 can be configured without using the write-clock generating circuit (PLL) 13 like the one shown in FIG. 13.

It should be noted that, while the present invention has been described through embodiments wherein the values of coefficients stored in the coefficient ROM unit 46 are found by using the least-square method, the description is not to be construed in a limiting sense. That is to say, the values of the coefficients to be stored in the coefficient ROM unit 46 can also be found by using another method. In addition, the present invention can also be applied to VCRs and other kinds of equipment besides the TV receiver.

On the top of that, in the embodiments of the present invention, a class code is determined for a predetermined pixel of interest as described above. It should be noted, however, that the scope of the present invention is not limited to the embodiments. For example, a class code can also be determined for each predetermined block.

Furthermore, the embodiments of the present invention are implemented by hardware blocks as described above. It is worth noting, however, that the scope of the present invention is not limited to such embodiments. For example, the embodiments can each be implemented by software executed by typically a CPU and stored in advance typically in a memory unit.

As described above, according to a TV-signal processing apparatus and a TV-signal processing method provided by the present invention for processing a TV signal, a correlation value quantitatively representing correlation between a first scanning line and a second scanning line adjacent to the first scanning line is computed and quantized to provide a class code. Coefficients indicated by the class code are then read out from a coefficient memory to be used in linear first-order combination processing of input video signals in order to delay the TV signal by a predetermined time. As a result, time-axis variations included the TV signal can be corrected with a high degree of reliability.

Also as described above, according to a TV-signal processing apparatus and a TV-signal processing method provided by the present invention for processing a TV signal, quantities of movement of a first scanning line and a second scanning line adjacent to the first scanning line are detected to provide a class code. Coefficients indicated by the class code are then read out from a coefficient memory to be used in linear first-order combination processing of input video signals in order to delay the TV signal by a predetermined time. As a result, time-axis variations included the TV signal can be corrected with a high degree of reliability.

It should be noted that those skilled in the art understand that the foregoing description merely explains preferred embodiments of the disclosed TV-signal processing apparatus and TV-signal processing method and that a variety of changes and modifications can be made to the preferred embodiments without departing from the essentials of the present invention. That is to say, the scope of the present invention is not limited to the preferred embodiments.

What is claimed is:

1. A television-signal processing apparatus for processing a television signal including a video signal having jitter comprising a plurality of scanning lines, said apparatus comprising:

an extracting means for extracting a carrier chrominance signal of a predetermined scanning line in a predetermined field of said video signal;

a class-code generating means for generating a class code on the basis of correlation between a first carrier chrominance signal of a first scanning line and a second carrier chrominance signal of a second scanning line adjacent to said first scanning line;

a coefficient generating means for generating a set of coefficients for a class indicated by said class code; and a video-signal generating means for generating a video signal in which jitters have been compensated from said video signal and said coefficients generated by said coefficient generating means.

2. A television-signal processing apparatus according to claim 1 wherein said coefficient generating means comprises a memory for storing a set of said coefficients for each class and a reading means for reading out said coefficients corresponding to said class code from said memory.

3. A television-signal processing apparatus for processing a television signal including a video signal having jitter comprising a plurality of scanning lines, said apparatus comprising:

an extracting means for extracting a carrier chrominance signal of a predetermined scanning line in a predetermined field of said video signal;

a class-code generating means for generating a class code on the basis of correlation between a first carrier chrominance signal of a first scanning line and a second carrier chrominance signal of a second scanning line adjacent to said first scanning line;

a coefficient generating means for generating a set of coefficients for a class indicated by said class code; and a video-signal generating means for generating a video signal in which jitters have been compensated from said video signal and said coefficients generated by said coefficient generating means, wherein said coefficient generating means comprises a memory for storing a set of said coefficients for each class and a reading means for reading out said coefficients corresponding to said class code from said memory, and wherein said coefficients are generated in advance in a learning process using at least a television signal for learning purposes.

4. A television-signal processing apparatus for processing a television signal including a video signal having jitter comprising a plurality of scanning lines, said apparatus comprising:

an extracting means for extracting a carrier chrominance signal of a predetermined scanning line in a predetermined field of said video signal;

a class-code generating means for generating a class code on the basis of correlation between a first carrier chrominance signal of a first scanning line and a second carrier chrominance signal of a second scanning line adjacent to said first scanning line;

a coefficient generating means for generating a set of coefficients for a class indicated by said class code; and a video-signal generating means for generating a video signal in which jitters have been compensated from said video signal and said coefficients generated by said coefficient generating means, wherein said class-code generating means generates a class code for at least a pixel of interest and said video-signal generating means generates a video signal in which jitters have been compensated for at least said pixel of interest by linear first-order combination of a set of said coefficients generated by said coefficient generating means and video signals of a plurality of pixels on a scanning line of a predetermined field including at least said pixel of interest.

5. A television-signal processing apparatus according to claim 1 wherein said class-code generating means comprises:

a correlation-value computing means for computing a correlation value between a first carrier chrominance signal of a first scanning line and a second carrier chrominance signal of a second scanning line adjacent to said first scanning line; and a quantization means for quantizing said correlation value computed by said correlation-value computing means into a quantized code and for outputting said quantized code as said class code.

6. A television-signal processing apparatus for processing a television signal including a video signal having jitter comprising a plurality of scanning lines, said apparatus comprising:

an extracting means for extracting a carrier chrominance signal of a predetermined scanning line in a predetermined field of said video signal;

a class-code generating means for generating a class code on the basis of correlation between a first carrier chrominance signal of a first scanning line and a second carrier chrominance signal of a second scanning line adjacent to said first scanning line;

a coefficient generating means for generating a set of coefficients for a class indicated by said class code; and a video-signal generating means for generating a video signal in which jitters have been compensated from said video signal and said coefficients generated by said coefficient generating means, wherein said extracting means extracts said carrier chrominance signal by subtracting the value of a video signal of a predetermined pixel from an average value of a predetermined number of video signals of a plurality of consecutive pixels including said predetermined pixel.

7. A television-signal processing apparatus according to claim 4 wherein said coefficients for each class are generated by applying a least-square method to video signals of television signals used for learning purposes during a predetermined learning period.

8. A television-signal processing apparatus according to claim 5 wherein said second scanning line is a scanning line which lags behind said first scanning line by a time corresponding to one line.

9. A television-signal processing apparatus for processing a television signal including a video signal having jitter comprising a plurality of scanning lines, said apparatus comprising:

an extracting means for extracting a carrier chrominance signal of a predetermined scanning line in a predetermined field of said video signal;

a class-code generating means for generating a class code on the basis of correlation between a first carrier chrominance signal of a first scanning line and a second carrier chrominance signal of a second scanning line adjacent to said first scanning line;

a coefficient generating means for generating a set of coefficients for a class indicated by said class code; and a video-signal generating means for generating a video signal in which jitters have been compensated from said video signal and said coefficients generated by said coefficient generating means, wherein said class-code generating means comprises a correlation-value computing means for computing a correlation value between a first carrier chrominance signal of a first scanning line and a second carrier chrominance signal of a second scanning line adjacent to said first scanning line; and a quantization means for quantizing said correlation value computed by said correlation-value computing means into a quantized code and for outputting said quantized code as said class code, wherein said second scanning line is a scanning line which lags behind said first scanning line by a time corresponding to one line, and wherein said correlation-value computing means computes a correlation value between a first carrier chrominance signal of said first scanning line and a first carrier chrominance signal of a first scanning line of a video signal in which jitters have been compensated generated by said video-signal generating means instead of a correlation value between a first carrier chrominance signal of said first scanning line and a second carrier chrominance signal of said second scanning line adjacent to said first scanning line.

10. A television-signal processing apparatus according to claim 9 wherein said correlation-value computing means computes a correlation value between a first carrier chrominance signal of said first scanning line of said video signal with corrected jitters generated by said video-signal generating means and a carrier chrominance signal of any scanning line except the first scanning line of a predetermined field of said video signal.

11. A television-signal processing apparatus for processing a television signal including a video signal having jitter comprising a plurality of scanning lines, said apparatus comprising:
    an extracting means for extracting a luminance signal of a predetermined scanning line in a predetermined field of said video signal;
    a class-code generating means for generating a class code on the basis of a movement quantity between a first luminance signal of a first scanning line and a second luminance signal of a second scanning line adjacent to said first scanning line;
    a coefficient generating means for generating a set of coefficients for a class indicated by said class code; and
    a video-signal generating means for generating a video signal in which jitters have been compensated from said video signal and said coefficients generated by said coefficient generating means.

12. A television-signal processing apparatus according to claim 11 wherein said coefficient generating means comprises a memory for storing a set of said coefficients for each class and a reading means for reading out said coefficients corresponding to said class code from said memory.

13. A television-signal processing apparatus for processing a television signal including a video signal having jitter comprising a plurality of scanning lines, said apparatus comprising:
    an extracting means for extracting a luminance signal of a predetermined scanning line in a predetermined field of said video signal;
    a class-code generating means for generating a class code on the basis of a movement quantity between a first luminance signal of a first scanning line and a second luminance signal of a second scanning line adjacent to said first scanning line;
    a coefficient generating means for generating a set of coefficients for a class indicated by said class code; and
    a video-signal generating means for generating a video signal in which jitters have been compensated from said video signal and said coefficients generated by said coefficient generating means,
    wherein said coefficient generating means comprises a memory for storing a set of said coefficients for each class and a reading means for reading out said coefficients corresponding to said class code from said memory, and
    wherein said coefficients are generated in advance in a learning process using at least a television signal for learning purposes.

14. A television-signal processing apparatus for processing a television signal including a video signal having jitter comprising a plurality of scanning lines, said apparatus comprising:
    an extracting means for extracting a luminance signal of a predetermined scanning line in a predetermined field of said video signal;
    a class-code generating means for generating a class code on the basis of a movement quantity between a first luminance signal of a first scanning line and a second luminance signal of a second scanning line adjacent to said first scanning line;
    a coefficient generating means for generating a set of coefficients for a class indicated by said class code; and
    a video-signal generating means for generating a video signal in which jitters have been compensated from said video signal and said coefficients generated by said coefficient generating means,
    wherein said class-code generating means generates a class code for at least pixel of interest and said video-signal generating means generates a video signal in which jitters have been compensated for at least said pixel of interest by linear first-order combination of a set of said coefficients generated by said coefficient generating means and video signals of a plurality of pixels on a scanning line of a predetermined field including at least said pixel of interest.

15. A television-signal processing apparatus according to claim 11 wherein said class-code generating means has a movement-quantity computing means for computing a movement quantity between a first luminance signal of a first scanning line and a second luminance signal of a second scanning line adjacent to said first scanning line and outputs said class code based on said computed movement quantity.

16. A television-signal processing apparatus for processing a television signal including a video signal having jitter comprising a plurality of scanning lines, said apparatus comprising:
    an extracting means for extracting a luminance signal of a predetermined scanning line in a predetermined field of said video signal;
    a class-code generating means for generating a class code on the basis of a movement quantity between a first luminance signal of a first scanning line and a second luminance signal of a second scanning line adjacent to said first scanning line;
    a coefficient generating means for generating a set of coefficients for a class indicated by said class code; and
    a video-signal generating means for generating a video signal in which jitters have been compensated from said video signal and said coefficients generated by said coefficient generating means,
    wherein said extracting means has a Y/C separation means for extracting a luminance signal.

17. A television-signal processing apparatus according to claim 14 wherein said coefficients for each class are generated by applying a least-square method to video signals of television signals used for learning purposes during a predetermined learning period.

18. A television-signal processing apparatus according to claim 15 wherein said second scanning line is a scanning line which lags behind said first scanning line by a time corresponding to one line.

19. A television-signal processing apparatus for processing a television signal including a video signal having jitter comprising a plurality of scanning lines, said apparatus comprising:

an extracting means for extracting a luminance signal of a predetermined scanning line in a predetermined field of said video signal;

a class-code generating means for generating a class code on the basis of a movement quantity between a first luminance signal of a first scanning line and a second luminance signal of a second scanning line adjacent to said first scanning line;

a coefficient generating means for generating a set of coefficients for a class indicated by said class code; and a video-signal generating means for generating a video signal in which jitters have been compensated from said video signal and said coefficients generated by said coefficient generating means, wherein said class-code generating means has a movement-quantity computing means for computing a movement quantity between a first luminance signal of a first scanning line and a second luminance signal of a second scanning line adjacent to said first scanning line and outputs said class code based on said computed movement quantity, wherein said second scanning line is a scanning line which lags behind said first scanning line by a time corresponding to one line, and wherein said movement-quantity computing means computes a movement quantity between a first luminance signal of said first scanning line and a first luminance signal of a first scanning line of a video signal in which jitters have been compensated generated by said video-signal generating means instead of a movement quantity between a first luminance signal of said first scanning line and a second luminance signal of said second scanning line adjacent to said first scanning line.

20. A television-signal processing apparatus according to claim 19 wherein said a movement-quantity computing means computes a movement quantity between a first luminance signal of said first scanning line of said video signal with corrected jitters generated by said video-signal generating means and a luminance signal of any scanning line except the first scanning line of a predetermined field of said video signal.

21. A television-signal processing method for processing a television signal including a video signal having jitter comprising a plurality of scanning lines, said method comprising the steps of:

extracting a carrier chrominance signal of a predetermined scanning line in a predetermined field of said video signal;

generating a class code on the basis of correlation between a first carrier chrominance signal of a first scanning line and a second carrier chrominance signal of a second scanning line adjacent to said first scanning line;

generating a set of coefficients for a class indicated by said class code; and generating a video signal in which jitters have been compensated from said video signal and said coefficients.

22. A television-signal processing method according to claim 21 whereby, at said step of generating a set of said coefficients, a memory for storing said coefficients for each class and a reading means for reading out said coefficients corresponding to said class code from said memory are used.

23. A television-signal processing method for processing a television signal including a video signal having jitter comprising a plurality of scanning lines, said method comprising the steps of:

extracting a carrier chrominance signal of a predetermined scanning line in a predetermined field of said video signal;

generating a class code on the basis of correlation between a first carrier chrominance signal of a first scanning line and a second carrier chrominance signal of a second scanning line adjacent to said first scanning line;

generating a set of coefficients for a class indicated by said class code; and generating a video signal in which jitters have been compensated from said video signal and said coefficients, wherein, at said step of generating a set of said coefficients, a memory for storing said coefficients for each class and a reading means for reading out said coefficients corresponding to said class code from said memory are used, and wherein said coefficients are generated in advance in a learning process using at least a television signal for learning purposes.

24. A television-signal processing method for processing a television signal including a video signal having jitter comprising a plurality of scanning lines, said method comprising the steps of:

extracting a carrier chrominance signal of a predetermined scanning line in a predetermined field of said video signal;

generating a class code on the basis of correlation between a first carrier chrominance signal of a first scanning line and a second carrier chrominance signal of a second scanning line adjacent to said first scanning line;

generating a set of coefficients for a class indicated by said class code; and generating a video signal in which jitters have been compensated from said video signal and said coefficients, wherein, at said step of generating a class code, a class code for at least pixel of interest is generated and, at said step of generating a video signal, a video signal in which jitters have been compensated for at least said pixel of interest is generated by linear first-order combination of said coefficients and video signals of a plurality of pixels on a scanning line of a predetermined field including at least said pixel of interest.

25. A television-signal processing method according to claim 21 wherein said step of generating a class code comprises the sub-steps of:

computing a correlation value between a first carrier chrominance signal of a first scanning line and a second carrier chrominance signal of a second scanning line adjacent to said first scanning line; and quantizing said correlation value into a quantized code and outputting said quantized code as said class code.

26. A television-signal processing method for processing a television signal including a video signal having jitter comprising a plurality of scanning lines, said method comprising the steps of:

extracting a carrier chrominance signal of a predetermined scanning line in a predetermined field of said video signal;

generating a class code on the basis of correlation between a first carrier chrominance signal of a first scanning line and a second carrier chrominance signal of a second scanning line adjacent to said first scanning line;

generating a set of coefficients for a class indicated by said class code; and generating a video signal in which jitters have been compensated from said video signal and said coefficients, wherein, at said step of extracting a carrier chrominance signal, said carrier chrominance signal is extracted by subtracting the value of a video signal of a predetermined pixel from an average value of a predetermined number of video signals of a plurality of consecutive pixels including said predetermined pixel.

27. A television-signal processing method according to claim 24 whereby said coefficients for each class are generated by applying a least-square method to video signals of television signals used for learning purposes during a predetermined learning period.

28. A television-signal processing method according to claim 25 wherein said second scanning line is a scanning line which lags behind said first scanning line by a time corresponding to one line.

29. A television-signal processing method for processing a television signal including a video signal having jitter comprising a plurality of scanning lines, said method comprising the steps of:

extracting a carrier chrominance signal of a predetermined scanning line in a predetermined field of said video signal;

generating a class code on the basis of correlation between a first carrier chrominance signal of a first scanning line and a second carrier chrominance signal of a second scanning line adjacent to said first scanning line;

generating a set of coefficients for a class indicated by said class code; and generating a video signal in which jitters have been compensated from said video signal and said coefficients, wherein said step of generating a class code comprises the sub-steps of computing a correlation value between a first carrier chrominance signal of a first scanning line and a second carrier chrominance signal of a second scanning line adjacent to said first scanning line, and quantizing said correlation value into a quantized code and outputting said quantized code as said class code, wherein said second scanning line is a scanning line which lags behind said first scanning line by a time corresponding to one line, and wherein, at said sub-step of computing a correlation value, said correlation value between a first carrier chrominance signal of said first scanning line and a first carrier chrominance signal of a first scanning line of a video signal in which jitters have been compensated is computed instead of a correlation value between a first carrier chrominance signal of said first scanning line and a second carrier chrominance signal of said second scanning line adjacent to said first scanning line.

30. A television-signal processing method according to claim 29 whereby, at said sub-step of computing a correlation value, said correlation between a first carrier chrominance signal of said first scanning line of said video signal with corrected jitters and a carrier chrominance signal of any scanning line except the first scanning line of a predetermined field of said video signal is computed.

31. A television-signal processing method for processing a television signal including a video signal having jitter comprising a plurality of scanning lines, said method comprising the steps of:

extracting a luminance signal of a predetermined scanning line in a predetermined field of said video signal;

generating a class code on the basis of a movement quantity between a first luminance signal of a first scanning line and a second luminance signal of a second scanning line adjacent to said first scanning line;

generating a set of coefficients for a class indicated by said class code; and generating a video signal in which jitters have been compensated from said video signal and said coefficients.

32. A television-signal processing method according to claim 31 whereby, at said step of generating a set of said coefficients, a memory for storing said coefficients for each class and a reading means for reading out said coefficients corresponding to said class code from said memory are used.

33. A television-signal processing method for processing a television signal including a video signal having jitter comprising a plurality of scanning lines, said method comprising the steps of:

extracting a luminance signal of a predetermined scanning line in a predetermined field of said video signal;

generating a class code on the basis of a movement quantity between a first luminance signal of a first scanning line and a second luminance signal of a second scanning line adjacent to said first scanning line;

generating a set of coefficients for a class indicated by said class code; and generating a video signal in which jitters have been compensated from said video signal and said coefficients, wherein, at said step of generating a set of said coefficients, a memory for storing said coefficients for each class and a reading means for reading out said coefficients corresponding to said class code from said memory are used, and wherein said coefficients are generated in advance in a learning process using at least a television signal for learning purposes.

34. A television-signal processing method for processing a television signal including a video signal having jitter comprising a plurality of scanning lines, said method comprising the steps of:

extracting a luminance signal of a predetermined scanning line in a predetermined field of said video signal;

generating a class code on the basis of a movement quantity between a first luminance signal of a first scanning line and a second luminance signal of a second scanning line adjacent to said first scanning line;

generating a set of coefficients for a class indicated by said class code; and generating a video signal in which jitters have been compensated from said video signal and said coefficients, wherein, at said step of generating a class code, a class code for at least pixel of interest is generated and, at said step of generating a video signal, a video signal in which jitters have been compensated for at least said pixel of interest is generated by linear first-order combination of said coefficients and video signals of a plurality of pixels on a scanning line of a predetermined field including at least said pixel of interest.

35. A television-signal processing method according to claim 31 wherein said step of generating a class code comprises the sub-steps of:

computing a movement quantity between a first luminance signal of a first scanning line and a second luminance signal of a second scanning line adjacent to said first scanning line; and outputting said class code based on said movement quantity.

36. A television-signal processing method for processing a television signal including a video signal having jitter comprising a plurality of scanning lines, said method comprising the steps of:

extracting a luminance signal of a predetermined scanning line in a predetermined field of said video signal;

generating a class code on the basis of a movement quantity between a first luminance signal of a first scanning line and a second luminance signal of a second scanning line adjacent to said first scanning line;

generating a set of coefficients for a class indicated by said class code; and generating a video signal in which jitters have been compensated from said video signal and said coefficients, wherein, at said step of extracting a luminance signal, a Y/C separation means for extracting said luminance signal is used.

37. A television-signal processing method according to claim 34 whereby said coefficients for each class are generated by applying a least-square method to video signals of television signals used for learning purposes during a predetermined learning period.

38. A television-signal processing method according to claim 35 wherein said second scanning line is a scanning line which lags behind said first scanning line by a time corresponding to one line.

39. A television-signal processing method for processing a television signal including a video signal having jitter comprising a plurality of scanning lines, said method comprising the steps of:

extracting a luminance signal of a predetermined scanning line in a predetermined field of said video signal;

generating a class code on the basis of a movement quantity between a first luminance signal of a first scanning line and a second luminance signal of a second scanning line adjacent to said first scanning line;

generating a set of coefficients for a class indicated by said class code; and generating a video signal in which jitters have been compensated from said video signal and said coefficients, wherein said step of generating a class code comprises the sub-steps of computing a movement quantity between a first luminance signal of a first scanning line and a second luminance signal of a second scanning line adjacent to said first scanning line, and outputting said class code based on said movement quantity, wherein said second scanning line is a scanning line which lags behind said first scanning line by a time corresponding to one line, and wherein, at said sub-step of computing a movement quantity, said movement quantity between a first luminance signal of said first scanning line and a first luminance signal of a first scanning line of a video signal in which jitters have been compensated is computed instead of a movement quantity between a first luminance signal of said first scanning line and a second luminance signal of said second scanning line adjacent to said first scanning line.

40. A television-signal processing method according to claim 39 whereby, at said sub-step of computing a movement quantity, said movement quantity between a first luminance signal of said first scanning line of said video signal with corrected jitters and any luminance signal of a scanning line except the first scanning line of a predetermined field of said video signal is computed.

* * * * *